(12) United States Patent
Gustaveson

(10) Patent No.: US 12,420,717 B2
(45) Date of Patent: Sep. 23, 2025

(54) CONFIGURABLE ROOF RACK AND ASSOCIATED COMPONENTS AND METHODS

(71) Applicant: Alan Gustaveson, Eden, UT (US)

(72) Inventor: Alan Gustaveson, Eden, UT (US)

( * ) Notice: Subject to any disclaimer, the term of this patent is extended or adjusted under 35 U.S.C. 154(b) by 492 days.

(21) Appl. No.: 17/810,234

(22) Filed: Jun. 30, 2022

(65) Prior Publication Data

US 2023/0001857 A1    Jan. 5, 2023

Related U.S. Application Data

(60) Provisional application No. 63/218,061, filed on Jul. 2, 2021.

(51) Int. Cl.
*B60R 9/045* (2006.01)
*B60R 9/058* (2006.01)

(52) U.S. Cl.
CPC .............. *B60R 9/045* (2013.01); *B60R 9/058* (2013.01)

(58) Field of Classification Search
CPC ............ B60R 9/45; B60R 9/058; B60R 9/042
See application file for complete search history.

(56) References Cited

U.S. PATENT DOCUMENTS

| | | | |
|---|---|---|---|
| 3,429,465 A * | 2/1969 | Gardner | B60P 1/32 298/12 |
| 3,963,136 A * | 6/1976 | Spanke | B60R 9/0423 224/310 |
| 4,350,471 A | 9/1982 | Lehmann | |
| 5,192,107 A | 3/1993 | Smith | |
| 5,988,470 A | 11/1999 | Siciliano | |
| 6,015,074 A | 1/2000 | Snavely et al. | |
| 6,425,508 B1 * | 7/2002 | Cole | B60R 9/045 224/330 |
| 6,681,970 B2 * | 1/2004 | Byrnes | B60R 9/042 224/310 |
| 6,712,247 B1 * | 3/2004 | Fox | B60R 9/042 224/310 |
| 6,729,513 B2 | 5/2004 | Kmita et al. | |
| 7,914,064 B2 | 3/2011 | Joab | |
| 9,457,727 B2 | 10/2016 | Hobbs | |
| 10,406,987 B1 | 9/2019 | Lester | |
| D1,027,797 S * | 5/2024 | Yang | D12/412 |

(Continued)

FOREIGN PATENT DOCUMENTS

| AU | 2003231667 A1 | 2/2004 |
|---|---|---|
| EP | 0348362 A1 | 12/1989 |

(Continued)

*Primary Examiner* — Brian D Nash
(74) *Attorney, Agent, or Firm* — TraskBritt

(57) ABSTRACT

A roof rack may include a first portion including a first outer bar, a first inner bar, and a first plurality of cross bars connecting the first inner bar to the first outer bar. The roof rack may further include a second portion aligned with the first portion and including a second outer bar, a second inner bar, and a second plurality of cross bars connecting the first inner bar to the first outer bar. The first portion and the second portion may be configured to separately connect to connecting rails of the vehicle, such that each of the first portion and the second portion may be independently positioned relative to the vehicle on the connecting rails.

20 Claims, 24 Drawing Sheets

(56) References Cited

U.S. PATENT DOCUMENTS

| | | | |
|---|---|---|---|
| 2004/0026472 A1* | 2/2004 | Foo | B60R 9/048 224/310 |
| 2004/0173651 A1 | 9/2004 | Kim et al. | |
| 2004/0188478 A1 | 9/2004 | Williams | |
| 2005/0023314 A1 | 2/2005 | Williams et al. | |
| 2006/0033360 A1* | 2/2006 | Taylor | B62D 33/044 296/24.44 |
| 2006/0285954 A1 | 12/2006 | Neary | |
| 2007/0175936 A1* | 8/2007 | Goyanko | B60R 9/042 224/309 |
| 2008/0264989 A1* | 10/2008 | Barquinero | B60R 9/055 224/315 |
| 2009/0145940 A1* | 6/2009 | Bukowiec | B60R 9/042 224/310 |
| 2013/0264366 A1* | 10/2013 | Hubbard | B60R 9/055 224/328 |
| 2015/0246643 A1* | 9/2015 | Levi | B60R 3/005 182/113 |
| 2017/0327050 A1* | 11/2017 | Cabiche | B60R 9/048 |
| 2018/0215322 A1* | 8/2018 | D'Angelo | B60R 9/045 |
| 2020/0148280 A1* | 5/2020 | Elder | B60R 9/02 |
| 2020/0148281 A1* | 5/2020 | Elder | B60R 9/12 |
| 2020/0361393 A1* | 11/2020 | Cabaniss | B60R 9/045 |
| 2020/0384837 A1* | 12/2020 | Singer | B60J 7/141 |

FOREIGN PATENT DOCUMENTS

| | | |
|---|---|---|
| EP | 0433495 A1 | 6/1991 |
| FR | 2673404 A1 | 9/1992 |
| GB | 0740489 A | 11/1955 |
| GB | 0740793 A | 11/1955 |
| GB | 2177055 A | 1/1987 |
| GB | 2544550 A | 5/2017 |
| WO | 00/01557 A1 | 1/2000 |

\* cited by examiner

CONFIGURABLE ROOF RACK AND ASSOCIATED COMPONENTS AND METHODS

CROSS-REFERENCE TO RELATED APPLICATION

This application claims the benefit under 35 U.S.C. § 119(e) of U.S. Provisional Patent Application Ser. No. 63/218,061, filed Jul. 2, 2021, the disclosure of which is hereby incorporated herein in its entirety by this reference.

TECHNICAL FIELD

Embodiments of the present disclosure generally relate to roof racks. In particular, embodiments of the present disclosure relate to configurable roof racks for placement on automobiles and associated components and methods.

BACKGROUND

A vehicle may have a passenger compartment and a trunk for carrying people and other cargo. However, large items may not fit within the passenger compartment or the trunk. In other cases, when the passenger compartment is filled with passengers the trunk may be insufficient to carry the cargo necessary for the passengers, such as when taking a trip. Roof racks may be attached to vehicles to increase storage capacity of the vehicle or to enable a vehicle to carry large or awkward shaped items that may be inconvenient or impossible to store inside the vehicle.

BRIEF SUMMARY

Embodiments of the present disclosure may include a roof rack for a vehicle. The roof rack may include a first portion including a first outer bar, a first inner bar, and a first plurality of cross bars connecting the first inner bar to the first outer bar. The roof rack may further include a second portion including a second outer bar, a second inner bar, and a second plurality of cross bars connecting the first inner bar to the first outer bar. The first portion and the second portion may be configured to separately connect to connecting rails of the vehicle, such that each of the first portion and the second portion may be independently positioned relative to the vehicle on the connecting rails.

Another embodiment of the present disclosure may include a method of adjusting a width of a roof rack mounted to a vehicle. The method may include loosening a bracket on a first portion of the roof rack. The method may further include sliding the first portion of the roof rack and the bracket along a connecting rail of a roof structure of the vehicle. The method may also include tightening the bracket in a new location of on the connecting rail of the roof structure of the vehicle. The method may further include loosening a second bracket on a second portion of the roof rack. The method may also include sliding the second portion of the roof rack and the second bracket along the connecting rail in an opposite direction from the first portion of the roof rack. The method may further include tightening the second bracket on the connecting rail of the roof structure of the vehicle.

Another embodiment of the present disclosure may include a roof rack mounting structure. The structure may include a mounting structure of a roof rack. The structure may further include a mounting bracket coupled to the mounting structure. The mounting bracket may include a spacing element extending substantially transverse to the mounting bracket extending between the mounting bracket and the mounting structure. The mounting bracket may further include clamping hardware extending from the mounting bracket to the mounting structure from a position laterally offset along the mounting bracket from the spacing element.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular roof rack or component thereof but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

Roof racks may be designed to be attached to existing roof features of a vehicle, such as side rails and connecting rails. Some vehicles may have roof racks specifically designed to be used on the particular vehicle with a specific size, shape, and/or mounting hardware. Such specific designs may be expensive and, in some cases, may not be available for some models of vehicles. Universal roof rack designs may feature mounting hardware configured to be secured to features that are present on most vehicles, such as side rails, connecting rails, door frames, drip rails, etc. Universal roof racks may not provide aesthetically pleasing or aerodynamic fits as they may be designed to fit multiple different vehicles and may only fit specific vehicles well while being too large or too small for other vehicles.

Figure 1:
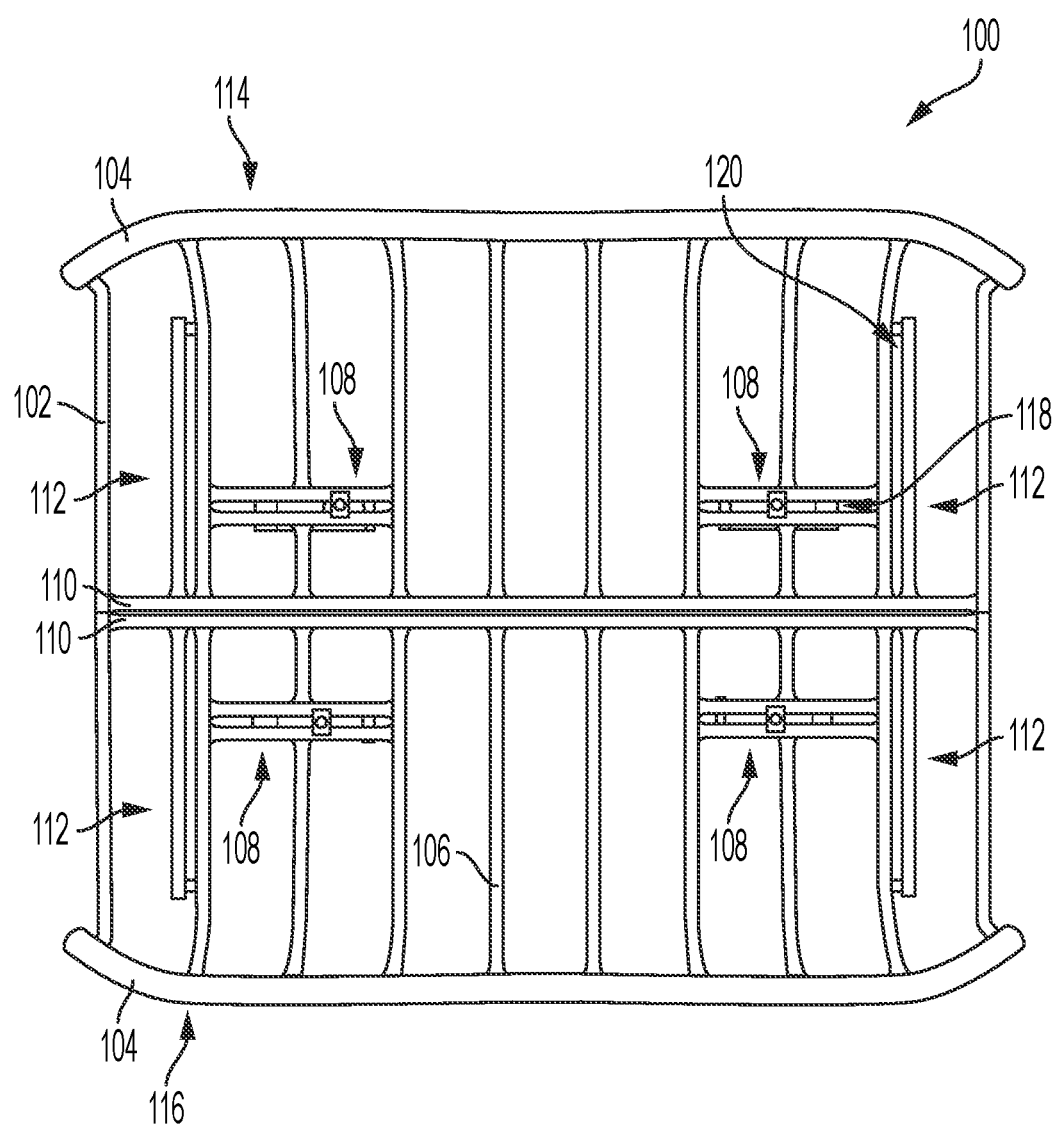
FIG. 1 illustrates a top view of a roof rack in accordance with one or more embodiments of the disclosure.
Figure 2:
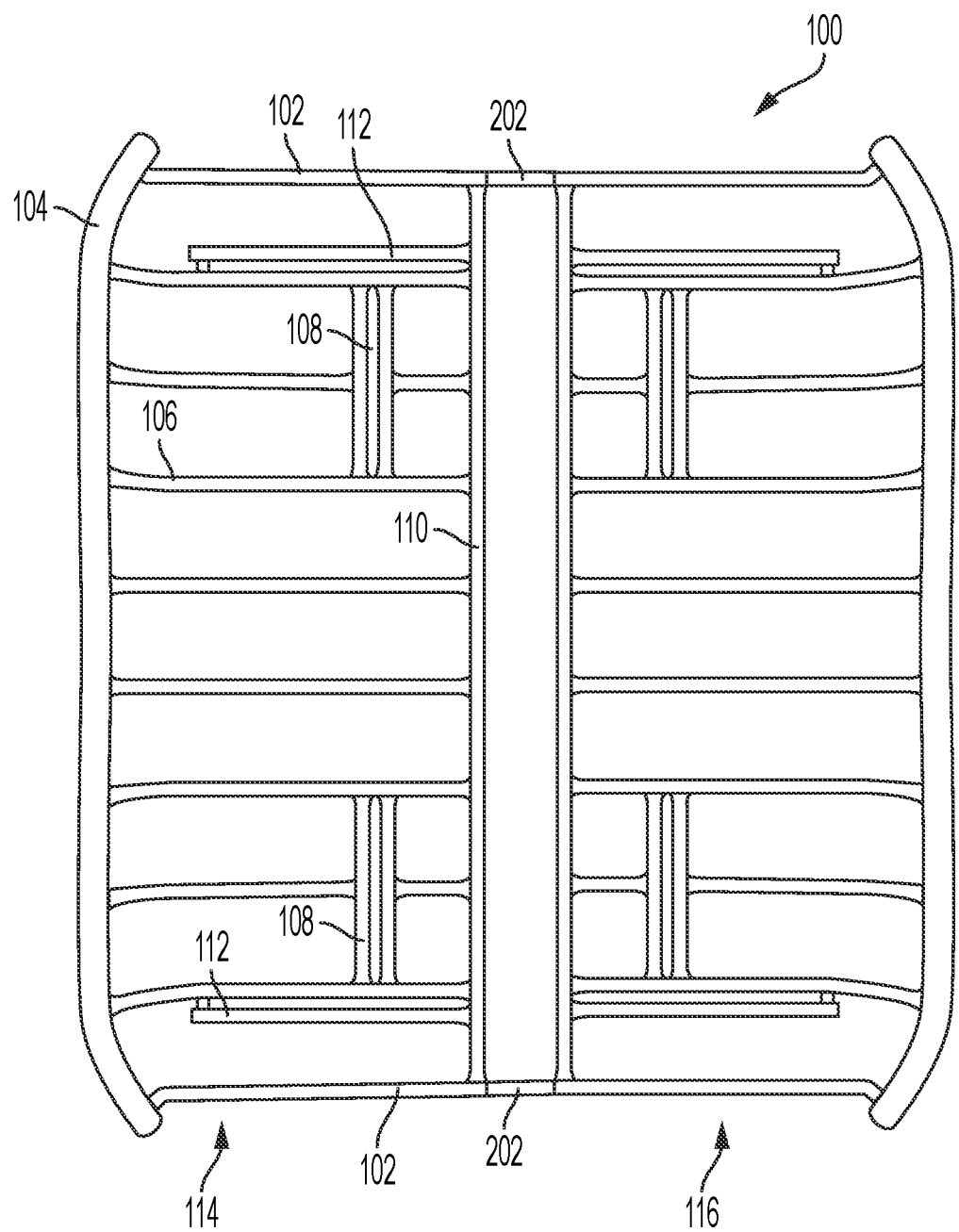
FIGS. 2 and 3 illustrate top views of the roof rack of FIG. 1 in expanded width configurations.
Figure 3:
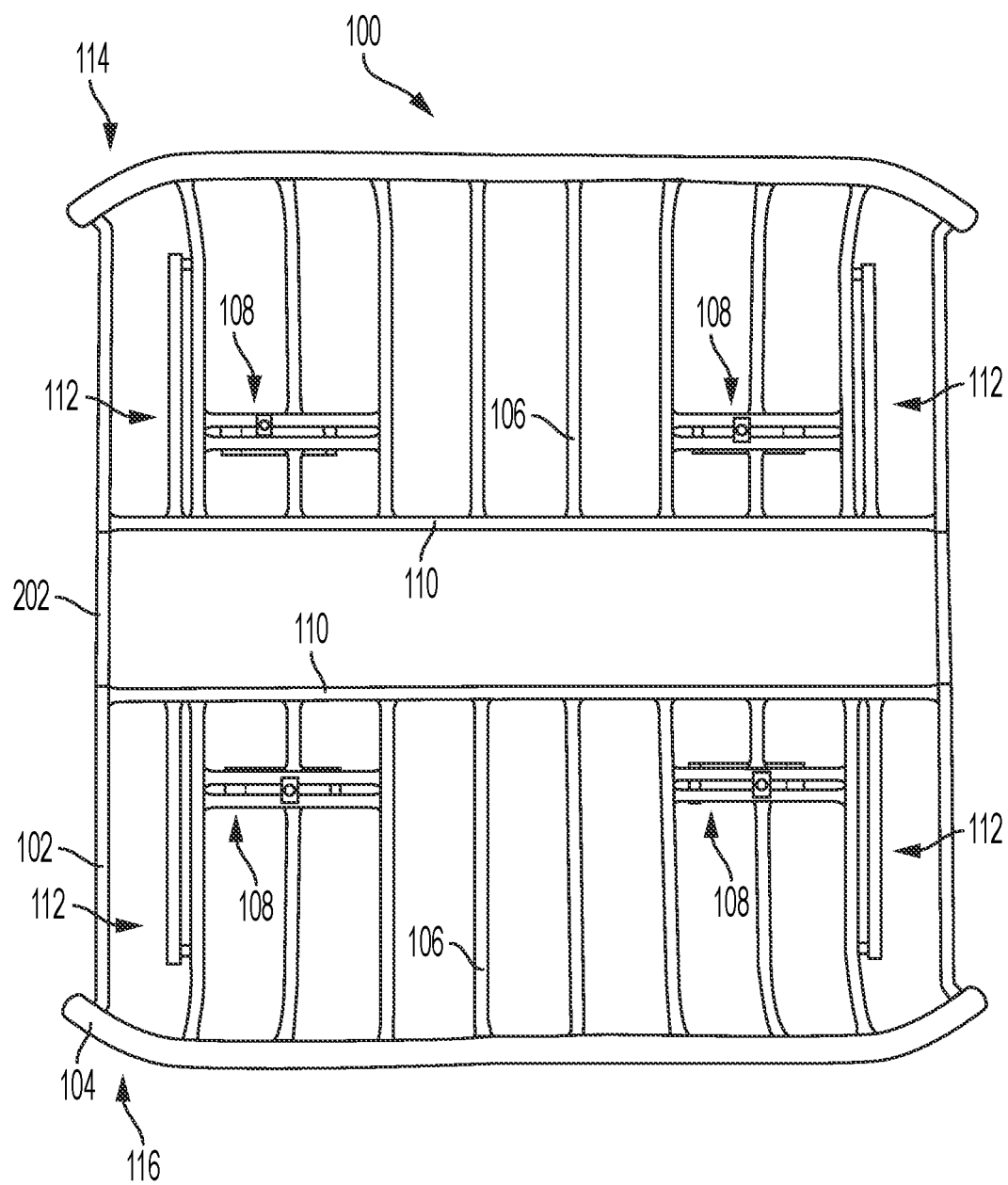

FIG. 1 through FIG. 3 illustrate different views of a roof rack 100 having an expandable width and multiple different mounting configurations configured to provide an aesthetically pleasing and aerodynamic fit on many vehicles having different sizes and designs. The roof rack 100 may be formed in a first half 114 and a second half 116. The first half 114 and the second half 116 may be substantially identical.

Each half 114, 116 may include an outer bar 104 configured to form a perimeter support for the roof rack 100. The outer bar 104 may be formed from a larger bar or heavier walled material (e.g., thicker material) from the other portions of the roof rack 100, configured to provide structural strength and/or rigidity to the roof rack 100. In some embodiments, the outer bar 104 may be formed from a higher strength material than other parts of the roof rack 100.

As illustrated, the outer bar 104 may have a curved or crescent shape. For example, the ends of the outer bar 104 may curve to a level of the central portion of the roof rack 100 and a central portion of the outer bar 104 may raise out of the plane of the roof rack 100. In some embodiments, the central portion of the outer bar 104 may be substantially flat in the raised configuration. The raised central portion of the outer bar 104 may be configured to retain cargo stored on the roof rack 100 and prevent or hinder cargo from sliding off the side of the roof rack 100.

Figure 13A:
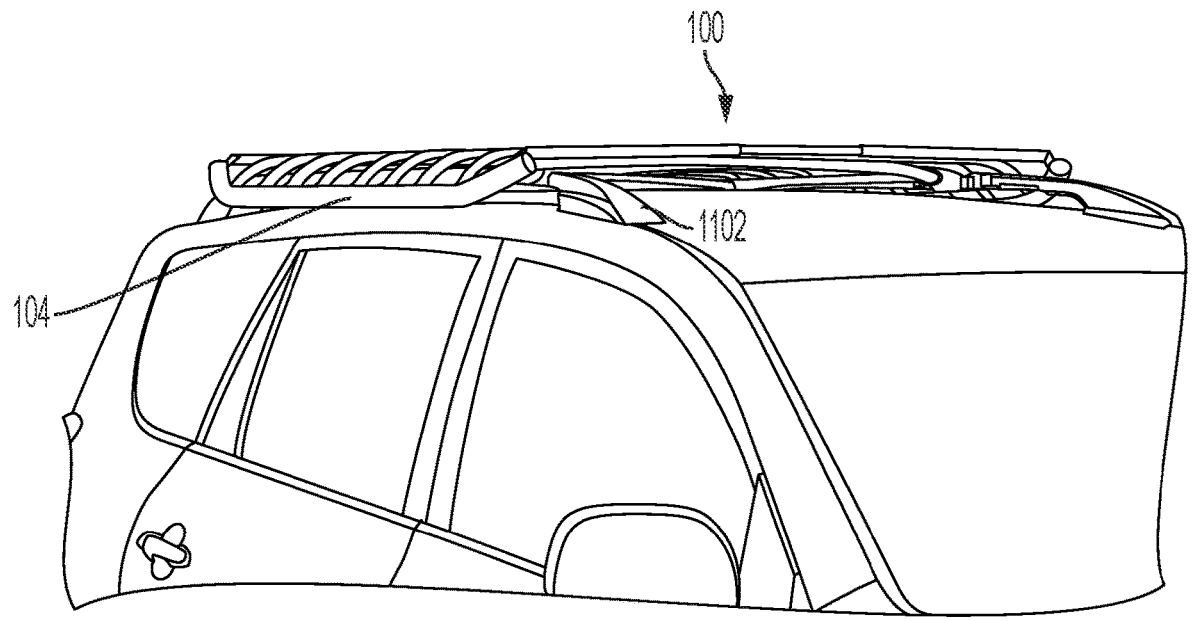
FIGS. 13A and 13B illustrate the roof rack of FIGS. 1 through 6 installed in an inverted configuration on a vehicle.
Figure 13B:
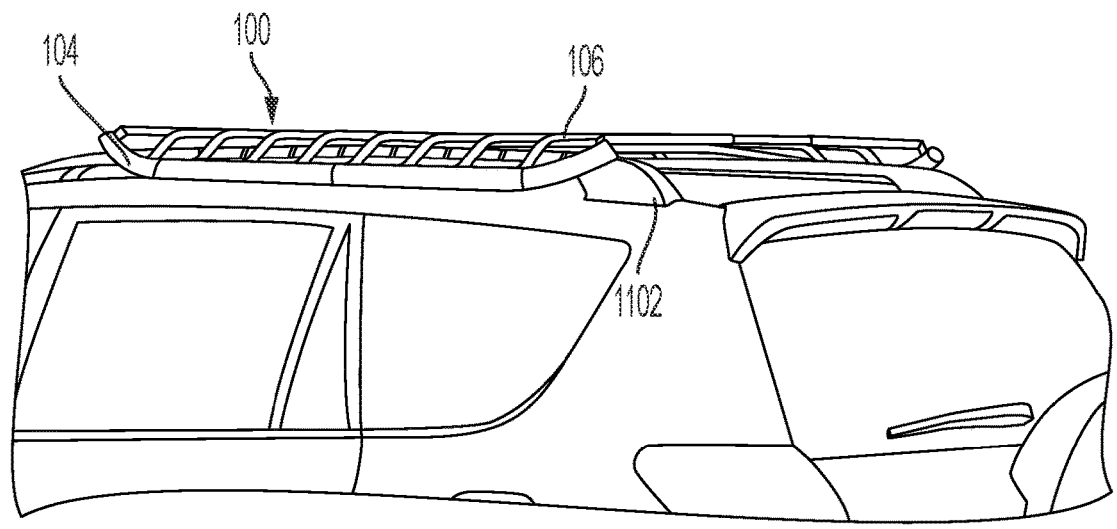

In some embodiments, the roof rack 100 may be configured to act as a platform, such that the outer bar 104 may not rise above the plain of the roof rack 100. For example, as illustrated in FIG. 13A, and FIG. 13B, the roof rack 100 may be mounted in an inverted configuration such that rather than raising above the plane of the roof rack 100 the outer bars 104 may extend below the plane of the roof rack 100. In other embodiments, the outer bars 104 may extend in substantially the same plane as the roof rack 100, such that the roof rack 100 may be substantially flat without lifted or lowered outer bars 104.

Each half 114, 116 may also include an inner bar 110 opposite the outer bar 104. When the two halves 114, 116 are mounted together to form the roof rack 100, the inner bars 110 may be proximate one another in a central portion of the roof rack 100. As illustrated in FIG. 1, when the roof rack 100 is in its narrowest configuration, the inner bars 110 of the two halves 114, 116 may be close together or even in contact with one another. FIG. 2 and FIG. 3 illustrate the roof rack 100 in wider configurations having larger distances between the inner bars 110 of the two halves 114, 116.

Each half 114, 116 may include multiple cross bars 106 extending between the respective inner bar 110 and outer bar 104. The cross bars 106 may be configured to provide a support platform for cargo placed in the roof rack 100. The cross bars 106 may also provide tie-down locations for securing the cargo to the roof rack 100. The cross bars 106 may also be configured to provide additional strength and/or rigidity to the roof rack 100.

In embodiments of the roof rack 100 where the outer bar 104 is raised or lowered into a different plane than the central plane of the roof rack 100, an outer portion of the inner bars 110 may be curved up or down to meet the outer bar 104. The curved ends of the cross bars 106 may form a basket-like structure configured to substantially prevent cargo from sliding off the side of the roof rack 100.

Each half 114, 116 of the roof rack 100 may include fairing bars 102. The fairing bars 102 may be configured to form front and/or rear structural bar for each half 114, 116 of the roof rack 100. The fairing bars 102 may provide a mounting point for a fairing, described in further detail below with respect to FIGS. 24 through 25C. A fairing may be a deflector shield formed from a light weight material, such as plastic or fiberglass, configured to deflect wind over the roof rack 100. The fairing may be configured to reduce air drag caused by the roof rack 100 thereby improving the aerodynamics of the roof rack 100 and the vehicle to which the roof rack 100 is attached.

The fairing may be a single piece configured to be attached to both the first half 114 and the second half 116 at the same time. Therefore, the fairing bars 102 of the first half 114 and the second half 116 may be coupled together with a telescoping faring connection 202. The telescoping faring connection 202 may be configured to align the first half 114 and the second half 116. In some embodiments, the telescoping faring connection 202 may be configured to secure a central portion of the fairing when installed.

The telescoping faring connection 202 may be configured to slide inside the fairing bars 102 of each of the first half 114 and the second half 116. For example, the fairing bars 102 may be formed from hollow tubes. The telescoping faring connection 202 may be a tube or shaft having a similar shaped cross-section to the hollow tubes of the fairing bars 102 with a smaller major dimension (e.g., diameter, radius, apothem, width, height, etc.), such that the telescoping faring connection 202 may be inserted into the hollow portion of the fairing bars 102.

Each half 114, 116 may include at least two vehicle connection points 108. The vehicle connection points 108 may be formed from two adjacent bars running transverse to the cross bars 106. The two adjacent bars of the vehicle connection points 108 may be separated by a small gap 118. The gap 118 may be configured to receive clamping hardware 506 that may be coupled to a bracket 502 for coupling the associated half 114, 116 of the roof rack 100 to the vehicle. The clamping hardware 506 and bracket 502 are described in further detail below with respect to FIG. 5 through FIG. 10. The gap 118 may extend the length of the vehicle connection point 108, such that the position of the clamping hardware 506 and bracket 502 may be adjusted based on the application (e.g., vehicle, type of roof structure, etc.).

Each half 114, 116 may also include at least two accessory connection points 112 on opposite ends of the respective first half 114 and second half 116. The accessory connection points 112 may be configured to receive additional components, such as a roof container, ski mounts, bike mounts, light bars, etc. The accessory connection points 112 may be formed from a bar running adjacent to one of the cross bars 106 forming a gap 120 similar to the gap 118 in the vehicle connection point 108. The gap 120 may extend substantially the same length as the accessory connection point 112. The gap 120 may be configured to receive mounting hardware for the accessory mount. The accessory mounting systems are described in further detail with respect to FIG. 15 through FIG. 18. The accessory connection points 112 in the first half 114 and the second half 116 may be substantially aligned when the roof rack 100 is installed on a vehicle, such that an accessory may span the space between the first half 114 and the second half 116.

Figure 4:
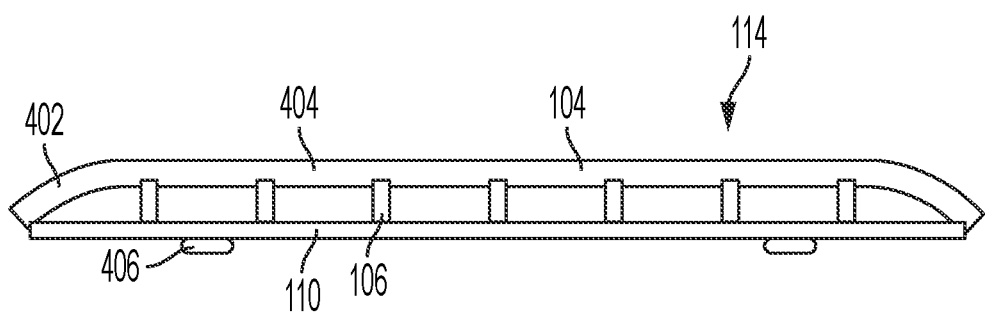
FIGS. 4-6 illustrate side views of the roof rack of FIG. 1.

FIG. 4 illustrates a side view of the first half 114 of the roof rack 100 from the inner bar 110 side of the first half 114. As illustrated in FIG. 4, the inner bar 110 may be substantially straight and the outer bar 104 may have a linear section 404 throughout the central portion of the outer bar 104 with curved sections 402 on either end, such that the linear section 404 of the outer bar 104 may be in a different plane than the inner bar 110. As described above, the cross bars 106 may be positioned in substantially the same plane as the inner bar 110 across a width of the first half 114 and may curve upward to attach to the outer bar 104 in the linear section 404 of the outer bar 104.

Many vehicles include roof structures including side rails extending longitudinally along a vehicles roof and connecting rails 406 extending between the side rails in a direction substantially transverse to the side rails. Some vehicles may only include the connecting rails 406 without side rails. The roof rack 100 may be configured to rest on the connecting rails 406 of a vehicle's roof structure. The inner bar 110 and the vehicle connection point 108 may rest on the connecting rail 406.

Figure 5:
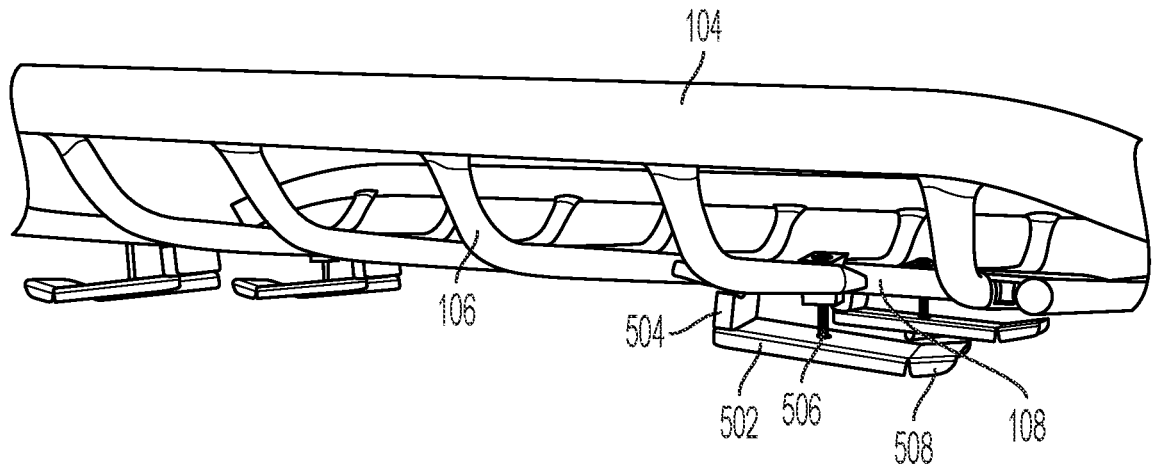
Figure 6:
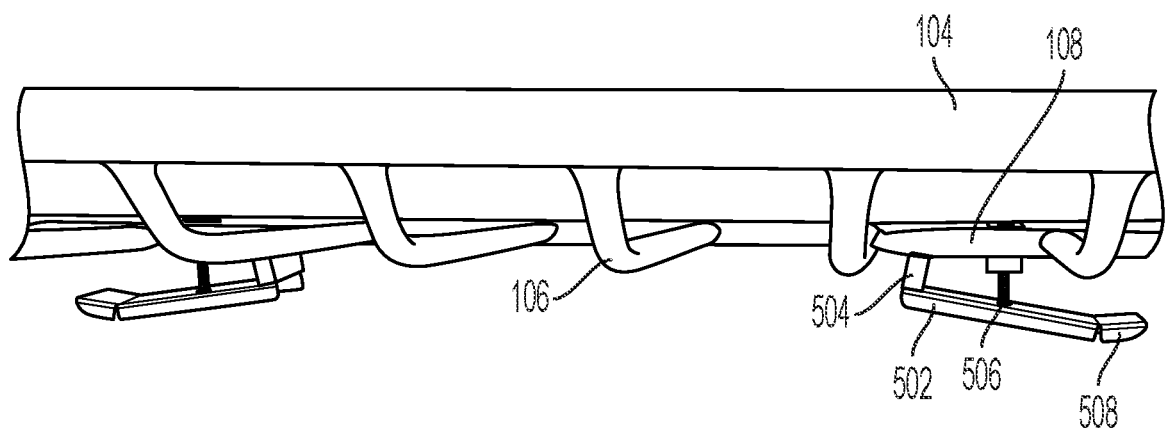

FIG. 5 and FIG. 6 illustrate different side views of the first half 114 or second half 116 of the roof rack 100 from the outer bar 104 side of the half 114, 116. The brackets 502 may extend below the vehicle connection points 108. The brackets 502 may be configured to clamp onto the connecting rails 406 as described in further detail below in FIG. 7A and FIG. 7B. The brackets 502 may be oriented in opposing directions as illustrated in FIG. 5 and FIG. 6. However, because the brackets 502 are separate parts, the brackets 502 may be installed in different orientations for different applications.

Each bracket 502 may be coupled to the respective vehicle connection point 108 through at least two distinct connection points. For example, the bracket 502 may include a stand-off 504 (e.g., spacing element, spacer, etc.) configured to couple the bracket 502 to the vehicle connection point 108 at an end of the bracket 502. The bracket 502 may also be coupled to the vehicle connection point 108 through clamping hardware 506 offset from the stand-off 504, such that as the clamping hardware 506 is tightened or loosened, the angle of the bracket 502 relative to the plane of the roof rack 100 may change. This may enable the bracket 502 to clamp onto the respective connecting rail 406, as described in further detail below.

Each bracket 502 may include a lip 508 extending at an angle from the bracket 502. The lip 508 may extend at an angle toward the roof rack 100 from the bracket 502, such that the bracket 502 may form a cupping shape. The lip 508 may be configured to secure the bracket 502 to the associated connecting rail 406. For example, the bracket 502 coupled with the lip 508 may at least partially wrap around the connecting rail 406 to clamp the roof rack 100 to the connecting rail 406 through the bracket 502.

Figure 7A:
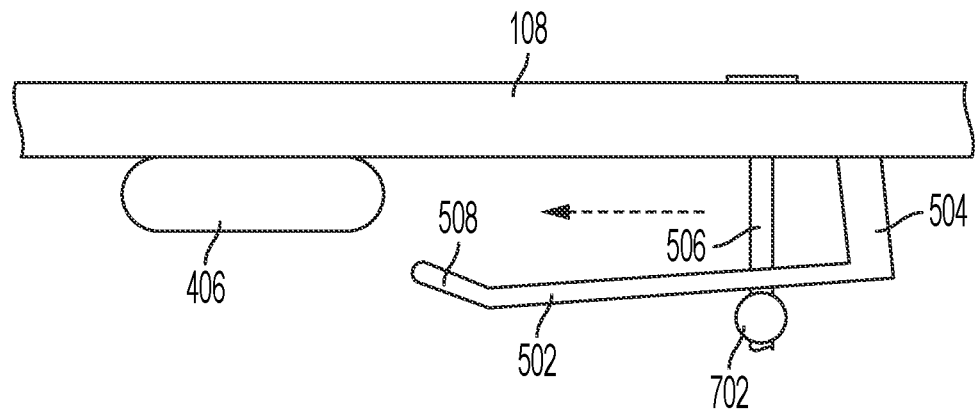
FIGS. 7A through 9 illustrate diagrammatic views of a bracket assembly in accordance with one or more embodiments of the disclosure.
Figure 7B:
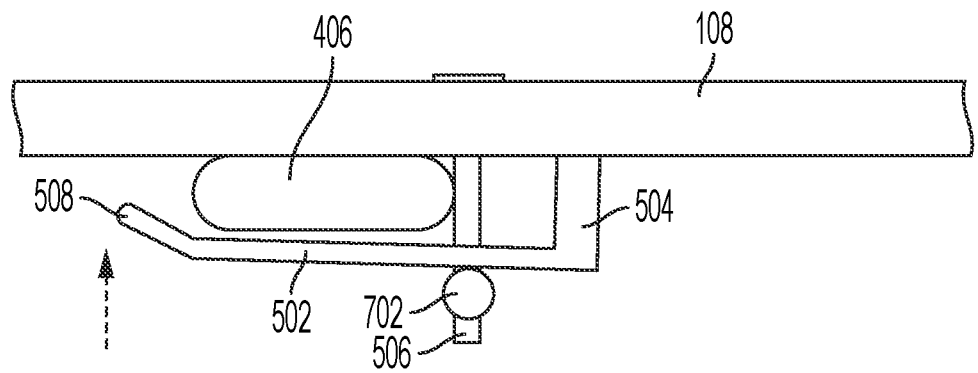

FIG. 7A and FIG. 7B illustrate the clamping process with the brackets 502 on opposing ends of each half 114, 116 of the roof rack 100. The clamping hardware 506 may be offset from the stand-off 504 by a distance, such that changing a length of the clamping hardware 506 may change an angle between the vehicle connection point 108 and the bracket 502.

In some embodiments, the length of the clamping hardware 506 may be adjusted through a clamping element 702. For example, the clamping hardware 506 may be a threaded fastener and the clamping element 702 may be a nut configured to screw up or down the threads of the threaded fastener changing the effective length of the threaded fastener. In other embodiments, the clamping hardware 506 may be an elastic element, such as rubber, bungee cord, etc., configured to stretch when a force is applied to the clamping hardware 506 and the clamping element 702 may be a bead or hook configured to maintain pressure on the bracket 502 from the elastic clamping hardware 506. In another embodiment, the clamping hardware 506 may be a pin, such as a clevis pin and the clamping element 702 may be a locking clip or pin configured to secure the clamping hardware 506 in position relative to the bracket 502.

As illustrated in FIG. 7A, the bracket 502 may be angled away from the vehicle connection point 108 by extending the length of the clamping hardware 506, such that the clamping hardware 506 is longer than the stand-off 504. Angling the bracket 502 away from the vehicle connection point 108 may enable the connecting rail 406 to be positioned between the bracket 502 and the vehicle connection point 108.

As illustrated in FIG. 7B, the bracket 502 may be angled toward the vehicle connection point 108 by shortening the length of the clamping hardware 506, such that the clamping hardware 506 is shorter than the stand-off 504. After the connecting rail 406 is positioned between the bracket 502 and the vehicle connection point 108, the clamping hardware 506 may be shortened, such that the bracket 502 may provide a clamping force on the connecting rail 406 between the bracket 502 and the vehicle connection point 108. As illustrated, the lip 508 may at least partially close off the open end of the bracket 502, such that the connecting rail 406 may not slide out of the space between the bracket 502 and the vehicle connection point 108.

Figure 8:
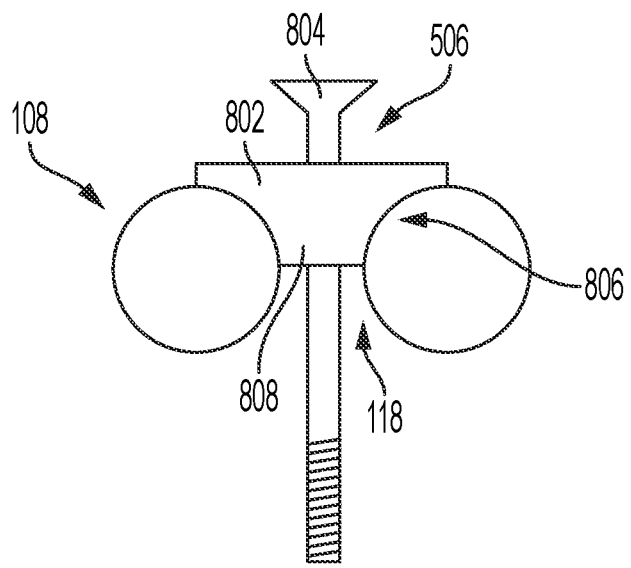

FIG. 8 illustrates the clamping hardware 506 interface with the vehicle connection point 108. As described above, the clamping hardware 506 may include a fastener 804. The fastener 804 may be coupled to the vehicle connection point 108 through a saddle 802. The saddle 802 may be configured to sit in the gap 118 between the bars of the vehicle connection point 108. The saddle 802 may include two opposing recesses 806 that may be substantially complementary to the bars of the vehicle connection point 108 and a protrusion 808 configured to extend into the gap 118 between the two bars.

The saddle 802 may be configured to slide along the two bars to any location within the gap 118. This may enable the clamping hardware 506 to be positioned at any location along the gap 118. Positioning the clamping hardware 506 at any location along the gap 118 may enable the position of the respective brackets 502 to be adjusted as needed for different applications.

The saddle 802 may also be configured to be inserted into the gap 118 from either side of the vehicle connection point 108, such that the bracket 502 may be positioned on either side of the vehicle connection point 108. This may enable the roof rack 100 to be inverted on the top of the associated vehicle, such that the outer bars 104 may extend below the plane of the roof rack 100 rather than above the plane of the roof rack 100. This orientation is discussed in further detail below with respect to FIG. 13A and FIG. 13B.

Figure 9:
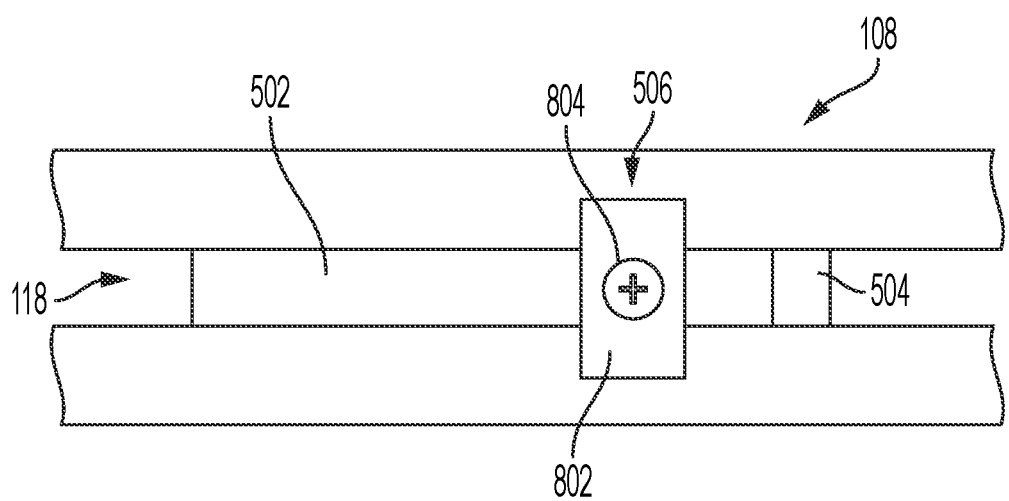

FIG. 9 illustrates the clamping hardware 506 installed in the vehicle connection point 108 from a top side of the clamping hardware 506. The saddle 802 may be coupled between the two bars of the vehicle connection point 108 spanning the gap 118. The fastener 804 may be positioned in a central portion of the saddle 802. The bracket 502 may be positioned on an opposite side of the vehicle connection point 108. The bracket 502 may be coupled to the saddle 802 through the fastener 804. As described above, the bracket 502 may also include a stand-off 504, which may be coupled to the vehicle connection point 108 at a position offset from the clamping hardware 506.

Figure 10:
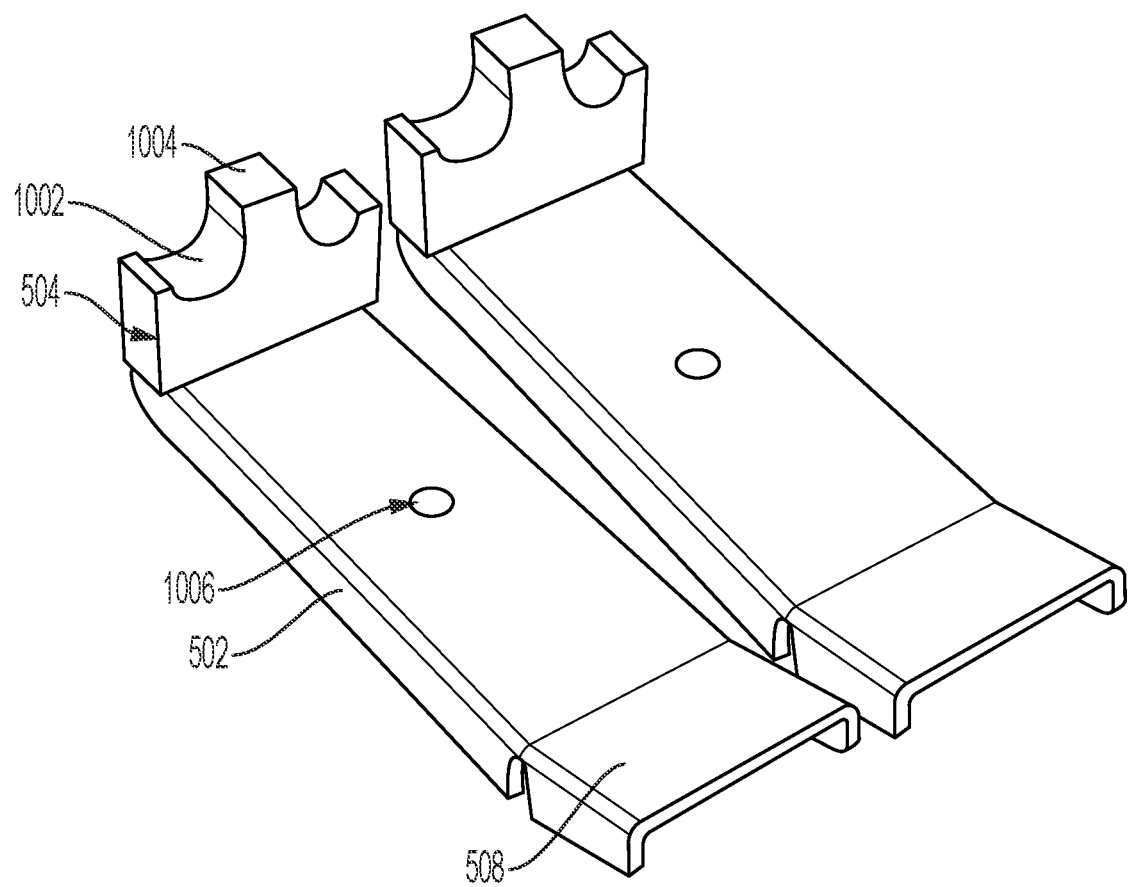
FIG. 10 illustrates a perspective views of the brackets of the bracket assembly illustrated in FIGS. 7A through 9.

FIG. 10 illustrates the brackets 502. Each bracket 502 may include a stand-off 504 on an end of the bracket 502. The stand-off 504 may be configured to interface with the vehicle connection point 108. The stand-off 504 may include at least two recesses 1002 having a complementary geometry to the two bars of the vehicle connection point 108. The stand-off 504 may also include a protrusion 1004 configured to extend into the gap 118 between the two bars of the vehicle connection point 108.

The protrusion 1004 may be configured to extend through the gap 118 and contact at least a portion of the bars of the vehicle connection point 108 opposite the bracket 502, such that the protrusion 1004 may resist being removed from the gap 118 between the two bars of the vehicle connection point 108. This may enable a larger clamping force to be applied to the bracket 502 without dislodging the stand-off 504.

The bracket 502 may also include an aperture 1006 configured to receive the fastener 804 of the clamping hardware 506. The aperture 1006 may be offset from the stand-off 504, as described above, to enable the clamping hardware 506 to change an angle between the bracket 502 and the vehicle connection point 108 increasing or decreasing the clamping effect of the bracket 502.

Figure 11A:
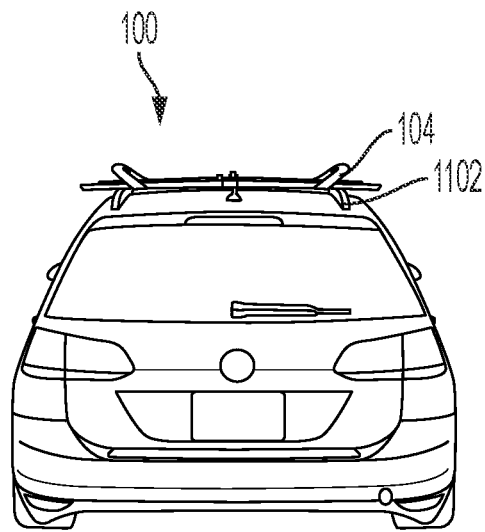
FIG. 11A illustrates the roof rack of FIGS. 1 through 6 installed in a narrow configuration on a vehicle.
Figure 11B:
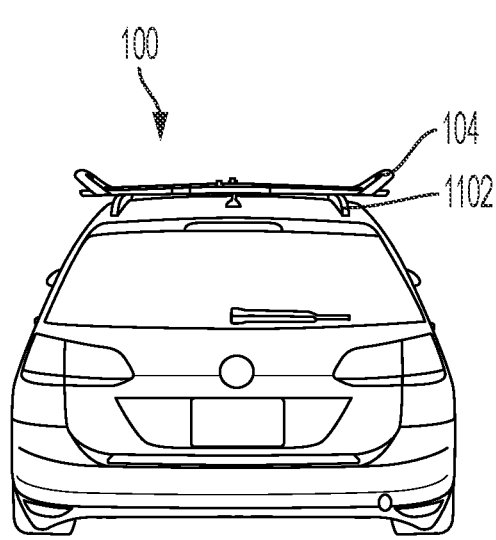
FIG. 11B illustrates the roof rack of FIGS. 1 through 6 installed in a wide configuration on the vehicle of FIG. 11A.

FIG. 11A and FIG. 11B illustrate the roof rack 100 installed on the same vehicle in a narrow configuration and a wide configuration. In FIG. 11A the roof rack 100 is illustrated in a narrow configuration with the outer bars 104 of the roof rack 100 inside the side rails 1102 of the vehicle. In the wider configuration illustrated in FIG. 11B, the outer bars 104 of the roof rack 100 may extend beyond the side rails 1102 of the vehicle. For example, the roof rack 100 may be installed in the narrow configuration for daily use to reduce the aerodynamic effects of the roof rack 100 by reducing the additional drag area added by the roof rack 100. When the roof rack 100 is needed to haul cargo, the roof rack 100 may be extended into the wider configuration to create additional space for hauling cargo on the roof rack 100.

The brackets 502 may enable the width of the roof rack 100 to be adjusted quickly by loosening the clamping hardware 506 and sliding each of the first half 114 and the second half 116 along the connecting rails 406 to the desired width before re-tightening the clamping hardware 506 to secure the first half 114 and second half 116 in the new configuration. The first half 114 and the second half 116 may be moved independently from one another with the only structural connection between the first half 114 and the second half 116 being the connecting rails 406 of the vehicle.

Figure 12:
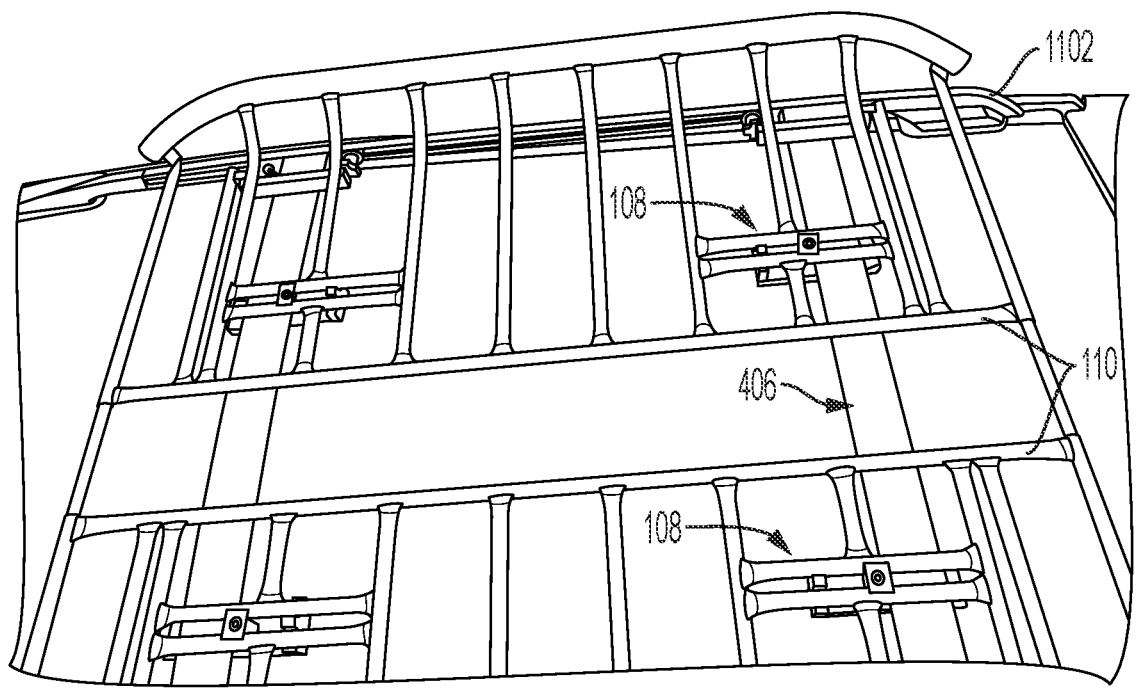
FIG. 12 illustrates the roof rack of FIGS. 1 through 6 installed in a wide configuration on a different vehicle from FIGS. 11A and 11B.

FIG. 12 illustrates the roof rack 100 installed in a wider configuration on a different vehicle than the vehicle illustrated in FIGS. 12A and 12B. On larger vehicles a wider configuration may be a more accurate match to the dimensions of the vehicle and may be more aesthetically pleasing.

As described above, the roof rack 100 may be coupled to the connecting rails 406 of the vehicle. The narrowest configuration of the roof rack 100 may be when the inner bars 110 of the first half 114 and the second half 116 are contacting each other. The width of the roof rack 100 may be increased by moving the vehicle connection points 108 outward along the connecting rails 406 of the vehicle. The widest configuration of the roof rack 100 may depend on the vehicle or characteristics of the vehicle, such as the width of the roof, the length of the connecting rails 406, the difference in height between the connecting rails 406 and the side rails 1102, etc.

FIG. 11A through FIG. 12 illustrate the roof rack 100 installed on different vehicles in an upright configuration with the outer bars 104 extending above the plane of the roof rack 100 to form a basket-like structure. As described above, the basket-like structure of the upright configuration may help to prevent cargo from sliding side-to-side on the roof rack 100 providing better load security.

The entire roof rack 100 may extend above the side rails 1102 of the vehicle. Therefore, the roof rack 100 may increase the drag area of the vehicle in the upright configuration. When the roof rack 100 is loaded with cargo the increase of the drag area of the roof rack 100 may be negligible in comparison with the increase in the drag area of the cargo loaded on the roof rack 100. However, when the roof rack 100 is not loaded with cargo reducing the additional drag area of the roof rack 100 may improve the fuel efficiency of the vehicle.

As described above, the roof rack 100 may be configured to be mounted in an inverted orientation as well. FIG. 13A and FIG. 13B illustrate the roof rack 100 installed in the inverted orientation. As illustrated, the outer bars 104 of the roof rack 100 may extend below the side rails 1102 of the vehicle. As described above, the width of the roof rack 100 may be adjusted as needed to reduce the additional drag area created by the roof rack 100. The change to the drag area of the vehicle may be substantially reduced in the inverted orientation when compared to the vehicle with the roof rack 100 in the upright orientation.

In the inverted orientation, the cross bars 106 of the roof rack 100 may provide a substantially flat surface across the roof of the vehicle. The cross bars 106 may enable a user to mount or store cargo on the substantially flat surface, such that the roof rack 100 may still be used to haul cargo in the inverted orientation.

Figure 14:
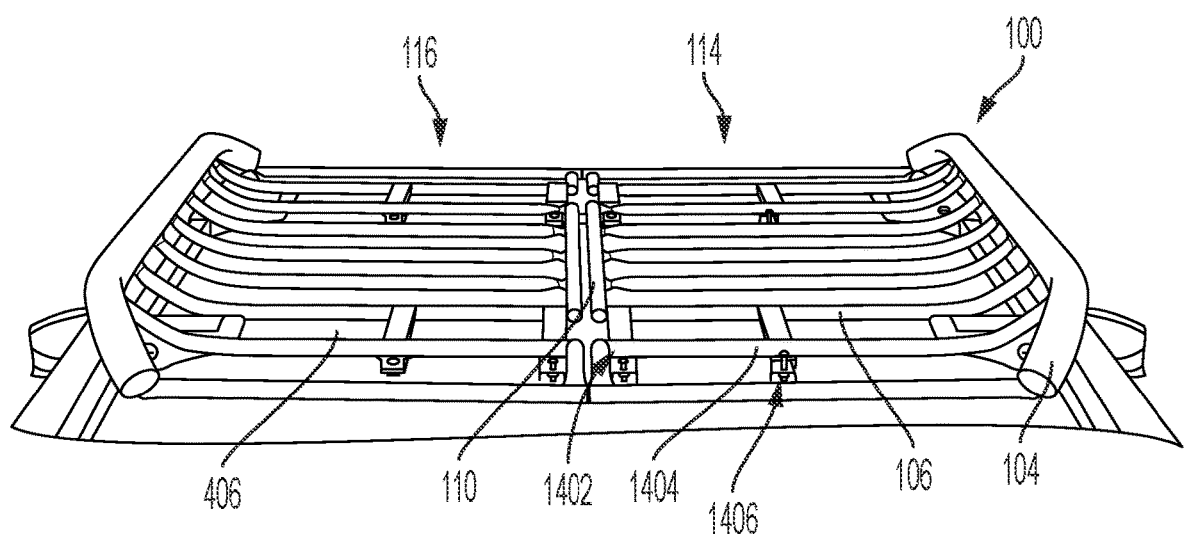
FIG. 14 illustrates a roof rack installed on a vehicle in accordance with one or more embodiments of the disclosure.

FIG. 14 illustrates another embodiment of the roof rack 100. As described above, the roof rack 100 may be formed in a first half 114 and a second half 116. Each of the first half 114 and the second half 116 may be substantially the same. The halves 114, 116 may each include an inner bar 110 and an outer bar 104 on opposite sides of the respective halves 114, 116. The inner bar 110 and outer bar 104 of each half 114, 116 may be connected through multiple cross bars 106. Each half 114, 116 of the roof rack 100 may be configured to be mounted to the connecting rails 406 of the vehicle through at least one inner clamp 1402 and at least one outer clamp 1404.

The inner clamp 1402 and the outer clamp 1404 may include clamping hardware 1406 configured to secure the inner clamp 1402 and the outer clamp 1404 to the connecting rail 406 of the vehicle. Each of the inner clamp 1402 and the outer clamp 1404 may include an upper clamp and a lower clamp configured to sandwich the connecting rail 406 between the upper clamp and the lower clamp. The clamping hardware 1406 may be configured to tighten the upper clamp and the lower clamp until the friction between the connecting rail 406 and the inner clamp 1402 and/or the outer clamp 1404 is sufficient to secure the respective half 114, 116 of the roof rack 100 relative to the connecting rail 406.

To adjust the width of the roof rack 100, the respective inner clamps 1402 and outer clamps 1404 may be loosened until each of the first half 114 and the second half 116 can slide along the connecting rail 406. Each of the first half 114 and the second half 116 may then be moved along the connecting rail 406 to the desired location and the respective inner clamps 1402 and outer clamps 1404 may then be tightened in the new locations.

Figure 15:
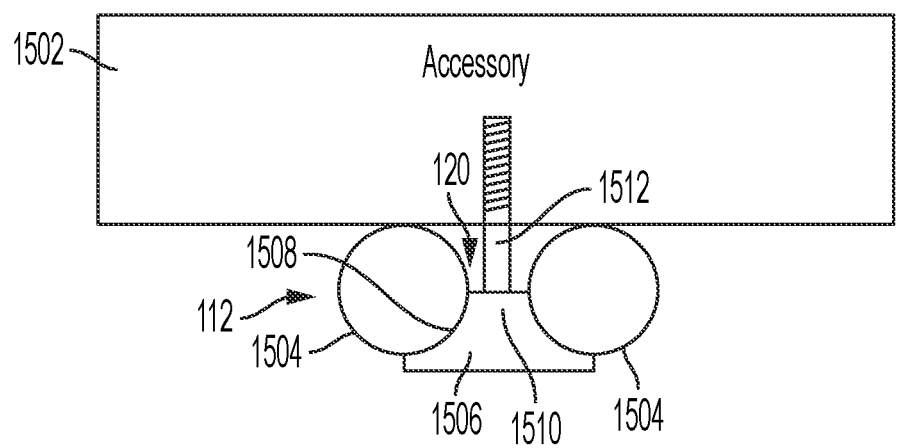
FIG. 15 illustrates an accessory mounting assembly in accordance with one or more embodiments of the disclosure.

FIG. 15 illustrates an embodiment of an accessory 1502 coupled to the accessory connection point 112 of the roof rack 100. As described above, the accessory connection point 112 may include at least two parallel bars 1504. The accessory 1502 may be configured to rest on top of the bars 1504 and be secured to the accessory connection point 112 through a fastener 1512 coupled to a saddle 1506 on an opposite side of the accessory connection point 112 from the accessory 1502. In some embodiments, the accessory connection point 112 may extend into a portion of the cross bar 106, where the cross bar 106 curves to attach to the outer bar 104, such that the bars 1504 may extend vertically and the accessory 1502 may be coupled to an inner side or outer side of the vertical bars 1504 with the saddle 1506 positioned on an opposite inner side or outer side of the vertical bars 1504.

The saddle 1506 may be similar to the saddle 802 described above for coupling the bracket 502 to the vehicle connection point 108. The saddle 1506 may include a protrusion 1510 configured to extend into the gap 120 between the bars 1504 of the accessory connection point 112. The saddle 1506 may also include recesses 1508 on either side of the protrusion 1510. The recesses 1508 may have complementary shapes to the bars 1504, such that the saddle 1506 may be securely positioned to bridge the gap 120 between the bars 1504 of the accessory connection point 112.

The fastener 1512 may be configured to be inserted through a central portion of the saddle 1506, such that the fastener 1512 may extend through the gap 120 between the bars 1504. The fastener 1512 may then be secured to the accessory 1502. For example, the fastener 1512 may be threaded, such that the fastener 1512 may be coupled to the accessory 1502 through a nut, bung, or other complementary threaded fastener. As the fastener 1512 is tightened the saddle 1506 and the accessory 1502 may compress together against the accessory connection point 112 generating a clamping force between the saddle 1506 and the accessory 1502 and the accessory connection point 112.

Figure 16:
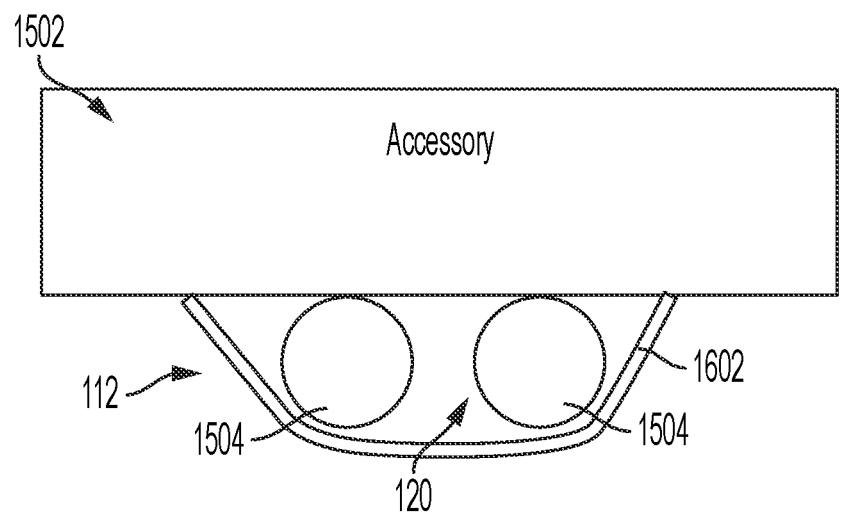
FIG. 16 illustrates an accessory mounting assembly in accordance with one or more embodiments of the disclosure.

FIG. 16 illustrates another embodiment of an accessory 1502 coupled to the accessory connection point 112. The accessory 1502 may be configured to rest on top of the bars 2204 and be secured to the accessory connection point 112 through a strap 1602 passing across an opposite side of at least one of the bars 1504 from the accessory 1502. As illustrated in FIG. 16, the strap 1602 may pass across both of the bars 1504 and be secured to the accessory 1502 on either side of the accessory connection point 112.

In some embodiments, the strap 1602 may be formed from an elastic material, such as rubber or bungee cord. In other embodiments, the strap 1602 may be formed from a less elastic material, such as leather, nylon, polyester, etc.

Figure 17:
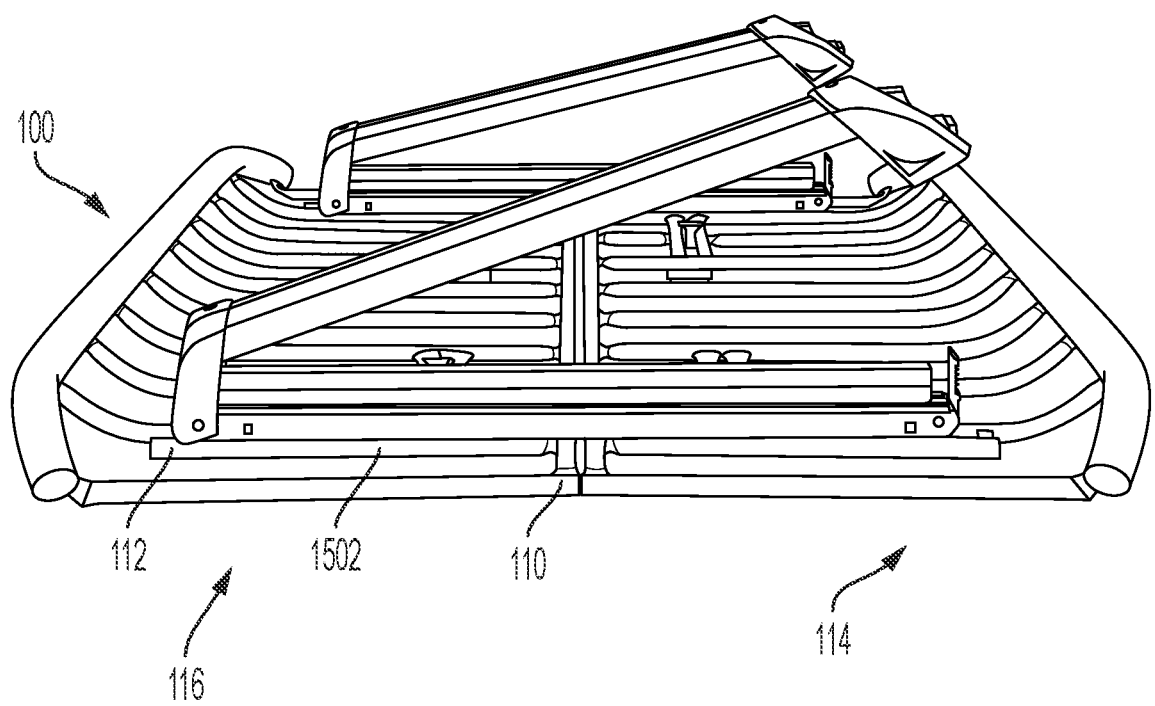
FIG. 17 illustrates the roof rack of FIGS. 1 through 6 with an accessory installed in accordance with one or more embodiments of the disclosure.
Figure 18:
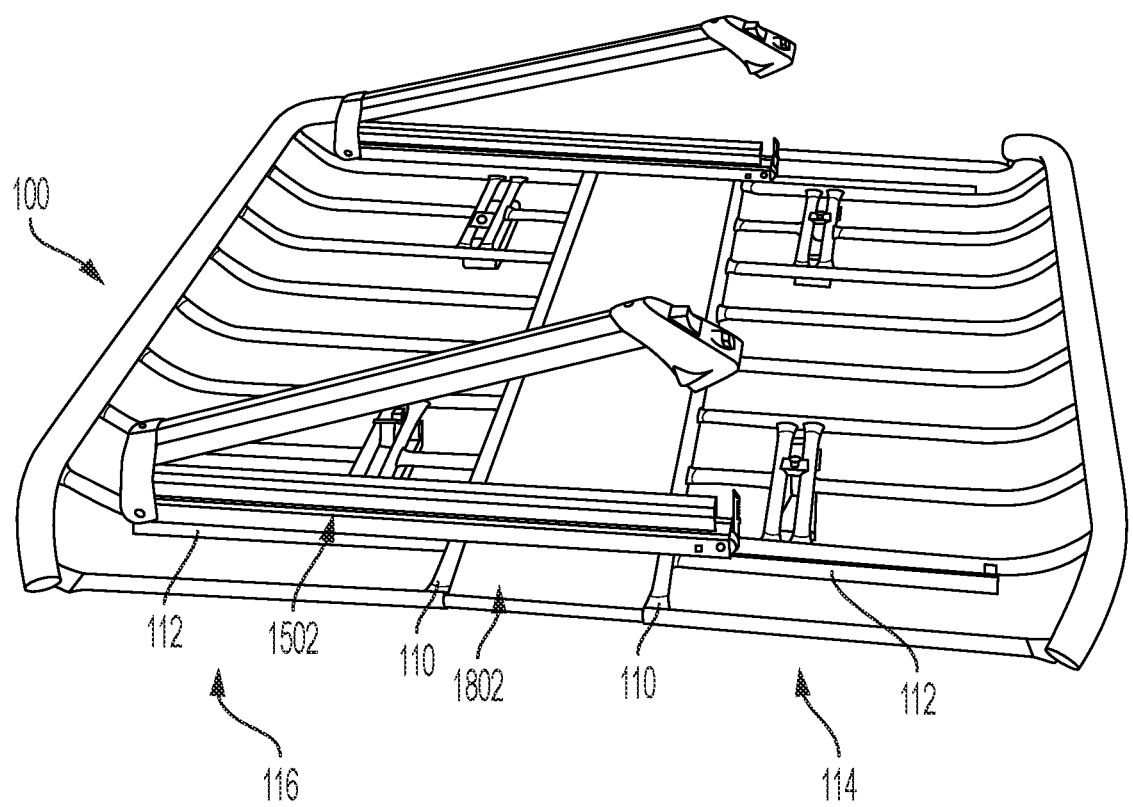
FIG. 18 illustrates the roof rack of FIGS. 1 through 6 with an accessory installed in a wide configuration in accordance with one or more embodiments of the disclosure.
Figure 19:
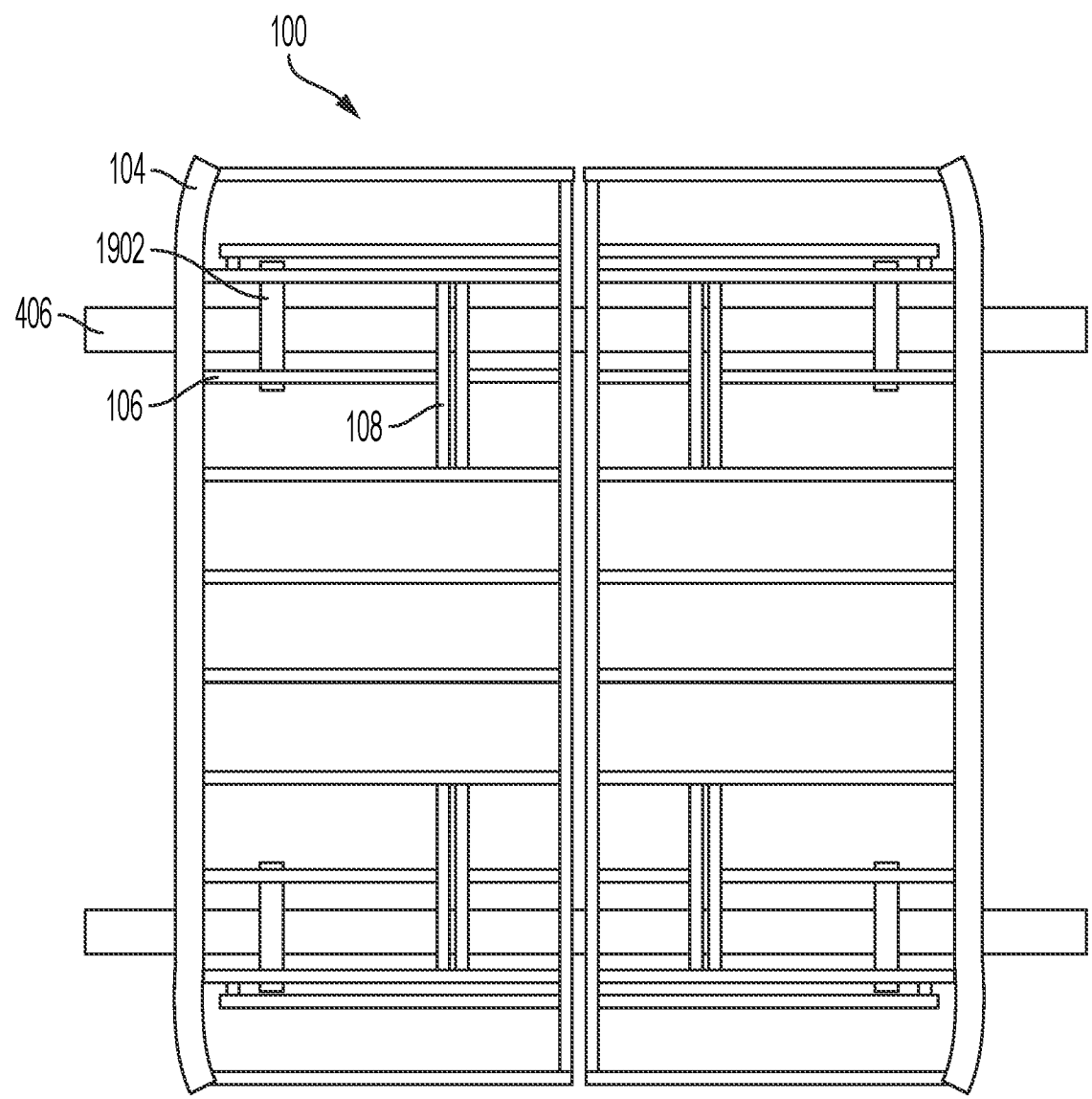
FIG. 19 illustrates a top-down view of the roof rack of FIGS. 1 through 6 in accordance with one or more embodiments of the disclosure.

FIG. 17 and FIG. 18 illustrate different views of the roof rack 100 with an accessory 1502 installed in the accessory connection points 112 of the roof rack 100. As illustrated, the accessory 1502 may be coupled to both the accessory connection points 112 in the first half 114 of the roof rack 100 the accessory connection points 112 in the second half 116 of the roof rack 100, such that the accessory 1502 may extend over the inner bars 110 of each of the first half 114 and the second half 116.

FIG. 18 illustrates the roof rack 100 in a wider configuration. As illustrated, the accessory 1502 may remain coupled to both the accessory connection point 112 of the second half 116 and the accessory connection point 112 of the first half 114. As the roof rack 100 is widened an open space 1802 may be defined between the inner bars 110 of the first half 114 and the second half 116. The accessory 1502 may be configured to span the open space 1802 as necessary to be coupled to both the first half 114 and the second half 116. In some embodiments, the accessory 1502 may only be coupled to the accessory connection points 112 of one of the first half 114 or second half 116, such that the accessory 1502 does not span the open space 1802 between the inner bars 110 of the first half 114 and the second half 116.

In some embodiments, the roof rack 100 may include additional supports configured to interface between the roof rack 100 and the roof structure of the vehicle. FIG. 19 through FIG. 23B illustrate different views of the roof rack 100 including additional supports 1902. The supports 1902 may be configured to create an additional interface between the roof rack 100 and the connecting rails 406 of the roof structure of the vehicle. As described above, the vehicle connection point 108 may rest on the connecting rails 406. The supports 1902 may also rest on the connecting rails 406 at a point offset from the vehicle connection points 108. The supports 1902 may be coupled between at least two cross bars 106 of the roof rack 100, such that the supports 1902 may interface with the connecting rails 406 at any position between the two cross bars 106.

The supports 1902 may be configured to maintain the roof rack 100 in a substantially flat orientation relative to the roof of the vehicle. For example, the support 1902 may be configured to support an outer portion of the roof rack 100, such as the portion proximate the outer bar 104. Supporting the roof rack 100 at the second outer portion may reduce strain in the brackets 502 and clamping hardware 506 and may spread the load of the roof rack 100 across the connecting rail 406.

Figure 20:
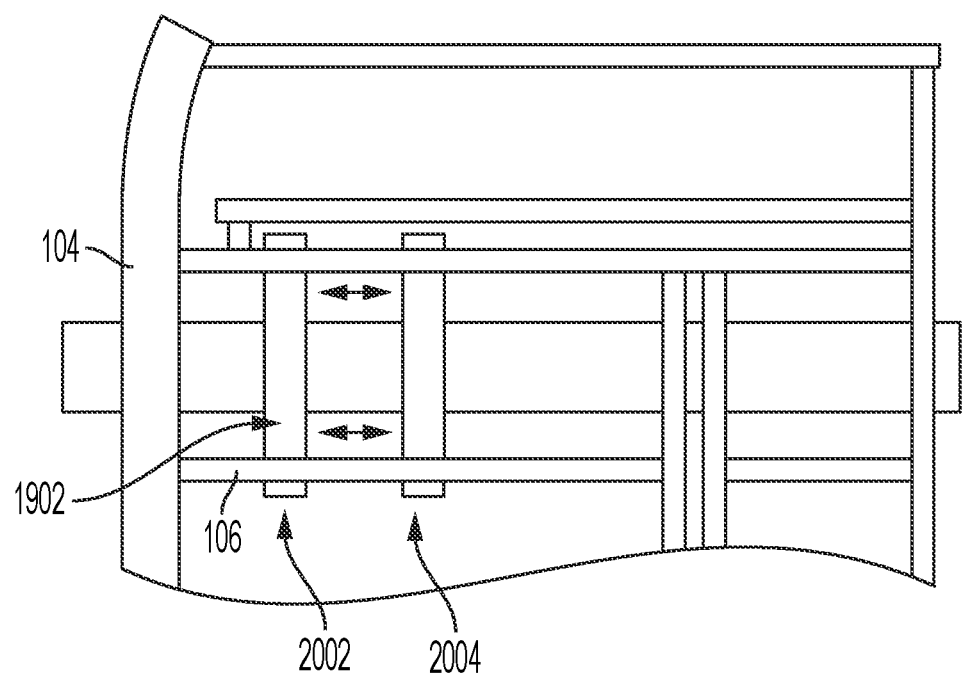
FIG. 20 illustrates an enlarged view of a portion of the roof rack illustrated in FIG. 19.

As illustrated in FIG. 20, the supports 1902 may be configured to slide along the cross bars 106 between a first position 2002 and a second position 2004, where the second position 2004 is offset from the vehicle connection point 108. The sliding connection between the supports 1902 and the cross bars 106 may enable the width of the roof rack 100 to be adjusted while maintaining the roof rack 100 in a flat or level orientation relative to the roof of the vehicle.

Figure 29:
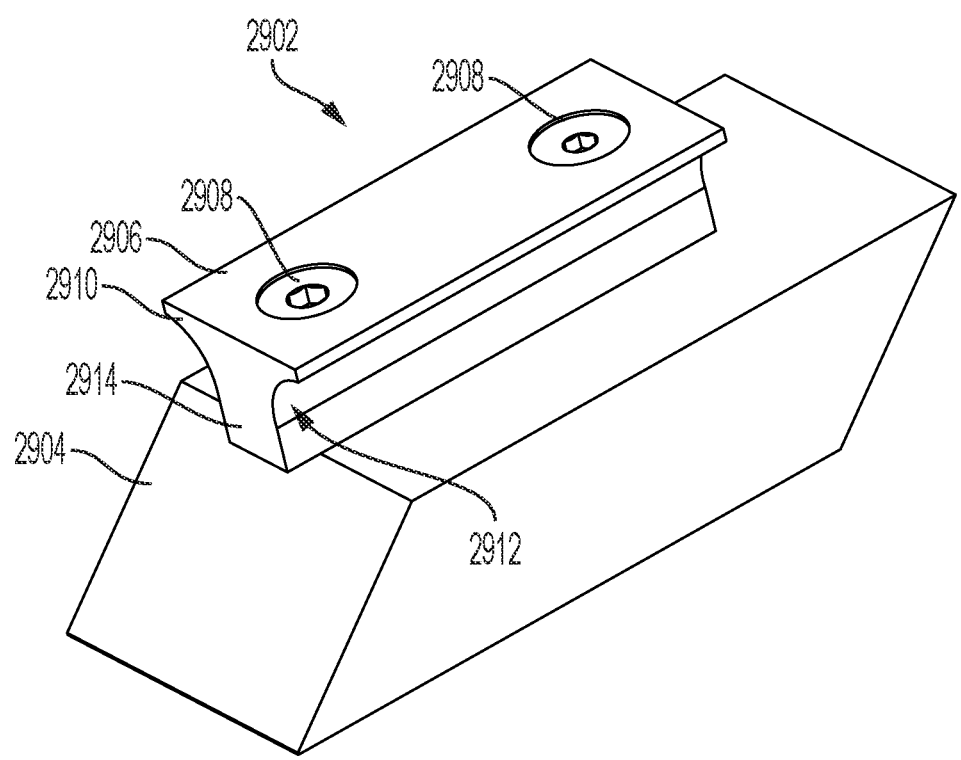
FIG. 29 illustrates a mounting component for a roof rack in accordance with one or more embodiments of the disclosure.

The sliding connection between the roof rack 100 and the support 1902 may be enabled by recesses 2102 configured to receive the cross bars 106 as illustrated in FIGS. 29 and 30. The recess 2102 may be substantially complementary to the cross bars 106, such that the cross bars 106 may rest in the recesses 2102. A top surface 2104 of the support 1902 may be substantially the same level or at a lower level than a platform level of the roof rack 100. The platform level of the roof rack 100 may be defined as the level of the platform defined by the upper most surfaces of the cross bars 106 or the level at which items resting on the cross bars 106 would be positioned. Therefore, the top surface 2104 of the support 1902 may be configured to not interrupt a substantially flat surface formed by the cross bars 106 of the roof rack 100.

Figure 21:
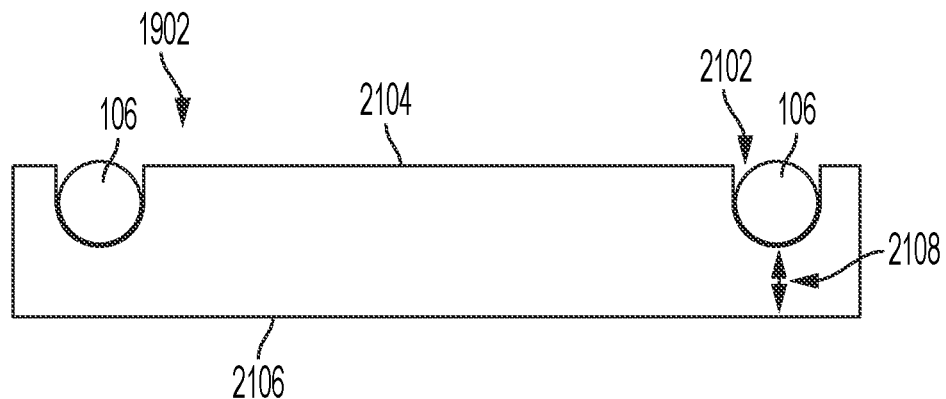
FIGS. 21 and 22 illustrate roof rack spacer in accordance with one or more embodiments of the disclosure.
Figure 22:
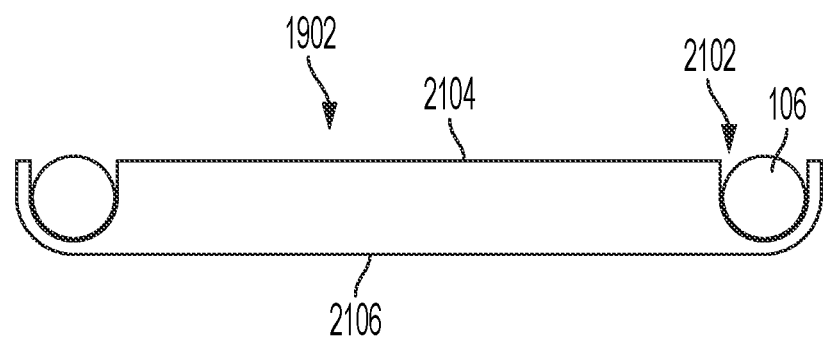

FIG. 21 illustrates an embodiment of the support 1902 configured to support the roof rack 100 in a raised position over the connecting rails 406, and FIG. 22 illustrates an embodiment of the support 1902 configured to support the roof rack 100 in a level position over the connecting rails 406. The different supports 1902 may enable the roof rack 100 to be mounted to different roof structures while maintaining a substantially flat platform surface of the roof rack 100.

The support 1902 illustrated in FIG. 21 may include a space 2108 between a bottom surface 2106 and the recess 2102 configured to receive the cross bar 106. The space 2108 may raise the cross bars 106 relative to the connecting rails 406. The space 2108 may be configured to enable the roof rack 100 to be mounted in a substantially flat orientation on connecting rails 406 that may be curved as illustrated in FIGS. 24A and 24B.

The support 1902 illustrated in FIG. 22 may not include a space between the bottom surface 2106 and the recess 2102. In other words, the support 1902 may be configured to form a bridge between the cross bars 106 without substantially changing a height of the bottom surface 2106 of the support 1902 from the bottom platform height of the roof rack 100 defined by the cross bars 106. The support 1902 may also be configured to enable the roof rack 100 to be mounted in a substantially flat orientation on connecting rails 406 that may be substantially flat.

Figure 23A:
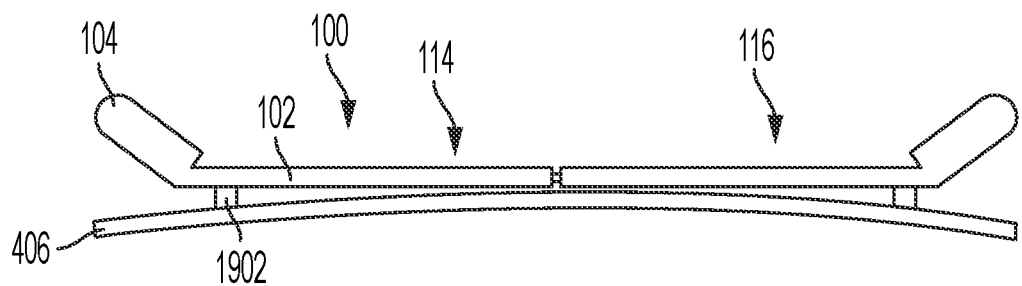
FIGS. 23A and 23B illustrate the roof rack of FIGS. 1 through 6 installed in different configurations with the roof rack spacers of FIGS. 21 and 22 in accordance with one or more embodiments of the disclosure.
Figure 23B:
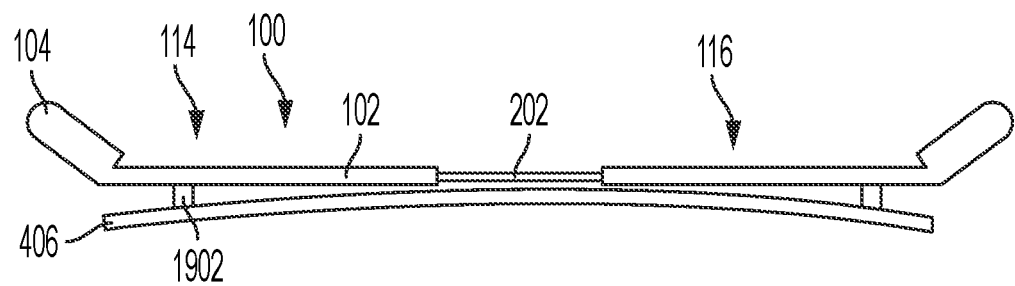

FIG. 23A illustrates the roof rack 100 in a narrow configuration installed on a curved connecting rail 406 and FIG. 23B illustrates the same roof rack 100 in a wide configuration installed on the curved connecting rail 406. As illustrated in FIGS. 24A and 24B, the supports 1902 may be positioned in substantially the same relative position along the connecting rail 406 in each configuration. Thus, the first half 114 and the second half 116 of the roof rack 100 may each move relative to the supports 1902.

The supports 1902 may be positioned such that the first half 114 and the second half 116 remain in a substantially flat (e.g., level, even, etc.) orientation relative to one another. As described above, the telescoping faring connection 202 may also be used to align the two halves 114, 116. Thus, the combination of the telescoping faring connection 202 and the supports 1902 may maintain the two halves 114, 116, in a substantially aligned and flat orientation.

As illustrated in FIGS. 24A and 24B, the supports 1902 may be positioned proximate the outer bars 104. The vehicle connection points 108 may be located proximate the inner bars 110 of the respective halves 114, 116, such that the vehicle connection points 108 may be located proximate a central portion of the roof rack 100. Thus, the load supported by the roof rack 100 may be transferred to the connecting rails 406 at each of the supports 1902 and at each of the vehicle connection points 108. These four areas may be positioned at different locations along the connecting rail 406, such that the load may be spread across the connecting rail 406.

In some cases, the roof rack 100 may be installed on a straight connecting rail 406. In some embodiments, the supports 1902 may be positioned in substantially the same position relative along the connecting rail 406 in each configuration, such that the first half 114 and the second half 116 of the roof rack 100 may each move relative to the supports 1902. In other embodiments, the supports 1902 may move with the respective halves 114, 116, such that the supports 1902 slide along the connecting rail 406. The supports 1902 may be positioned proximate the outer bars 104. The vehicle connection points 108 may be located proximate the inner bars 110 of the respective halves 114, 116, such that the vehicle connection points 108 may be located proximate a central portion of the roof rack 100. Thus, the load supported by the roof rack 100 may be transferred to the connecting rails 406 at each of the supports 1902 and at each of the vehicle connection points 108. These four areas may be positioned at different locations along the connecting rail 406, such that the load may be spread across the connecting rail 406.

Figure 24:
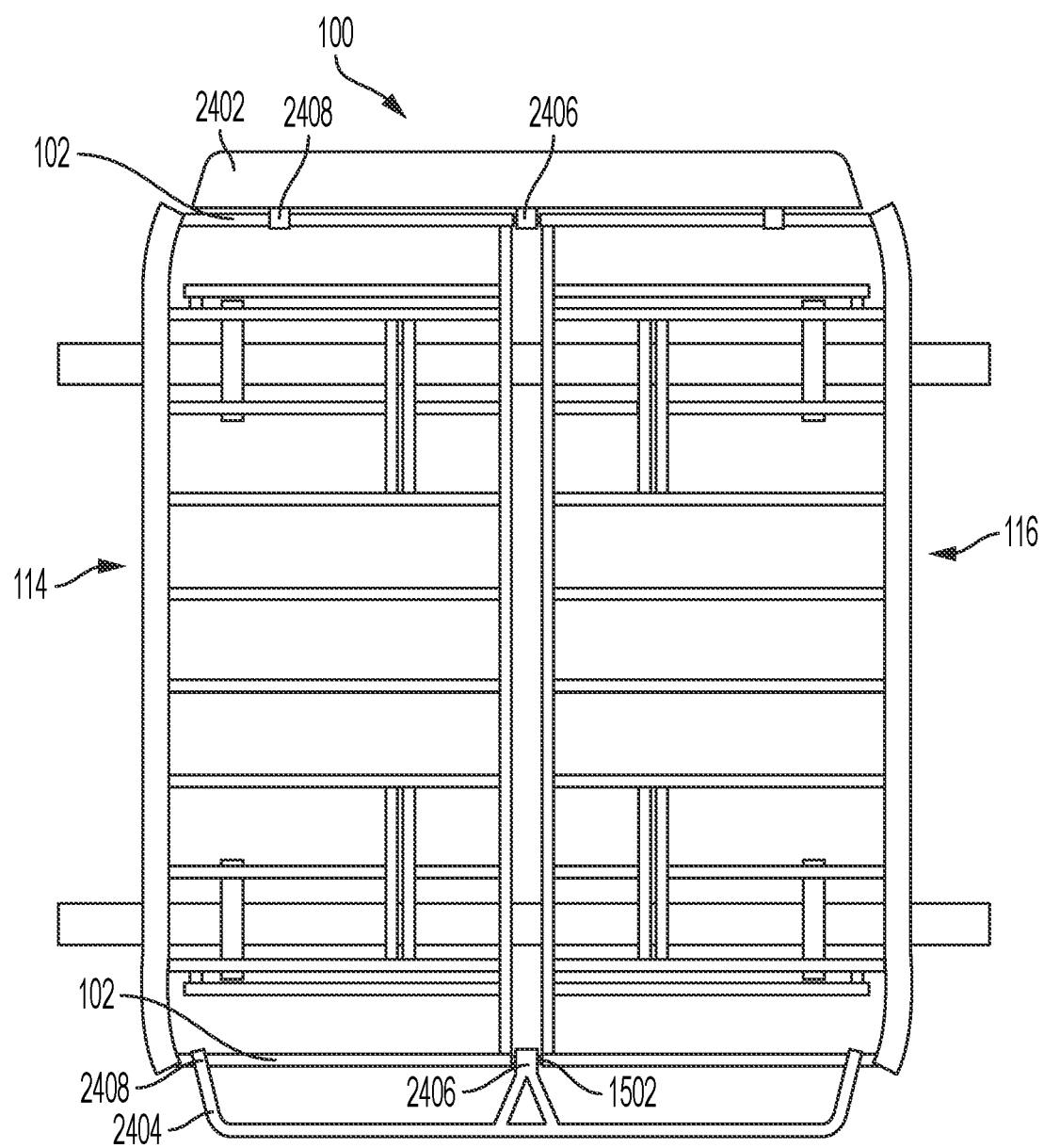
FIG. 24 illustrates a top-down view of the roof rack of FIGS. 1 through 6 with fairings installed in accordance with one or more embodiments of the disclosure.

As described above, the roof rack 100 may include a fairing coupled to at least one of front or rear fairing bars 102. FIG. 24 through FIG. 25C illustrate embodiments of the roof rack 100 including fairings 2402, 2404. A closed fairing 2402 may be coupled to a front fairing bar 102 of the roof rack 100. The closed fairing 2402 may be configured to improve aerodynamics of the roof rack 100 by deflecting air over the roof rack 100. In some embodiments, the closed fairing 2402 may also be configured to enclose a front portion of the roof rack 100 creating a basket-like structure. In some embodiments, the closed fairing 2402 may be coupled to a rear portion of the roof rack 100.

An open fairing 2404 may be coupled to a rear fairing bar 102 of the roof rack 100. The open fairing 2404 may be configured to allow air to flow through the open fairing 2404. The open fairing 2404 may also be configured to enclose the rear portion of the roof rack 100 creating a basket-like structure similar to the closed fairing 2402 in the front portion of the roof rack 100. In some embodiments, the open fairing 2404 may be coupled to the front portion of the roof rack 100. For example, the roof rack 100 may include an open fairing 2404 coupled to the front portion of the roof rack 100 and another open fairing 2404 coupled to the rear portion of the roof rack 100.

The closed fairing 2402 and the open fairing 2404 may be coupled to the respective fairing bars 102 through one or more couplers 2408. In some embodiments, the couplers 2408 may be configured to allow the closed fairing 2402 and open fairing 2404 to rotate about the respective fairing bars 102 in an hinging action, such that the closed fairing 2402 and open fairing 2404 may be moved between a substantially flat orientation or in an upward basket-like orientation as illustrated in FIGS. 26A through 26C. The couplers 2408 may be configured to slide along the respective fairing bars 102, such that the first half 114 and the second half 116 of the roof rack 100 may be moved into a wide configuration or a narrow configuration while the closed fairing 2402 and/or open fairing 2404 are coupled to the respective fairing bars 102.

The closed fairing 2402 and the open fairing 2404 may also include a central coupler 2406 configured to couple the closed fairing 2402 and the open fairing 2404 to the respective telescoping faring connection 202 in a central location.

FIGS. 26A through 26C illustrate the roof rack 100 with fairings 2602a, 2602b coupled to either end of the roof rack 100. The fairings 2602a, 2602b may be closed fairings 2402 or open fairings 2404. As described above, the, the fairings 2602a, 2602b may be coupled to the roof rack 100 through couplers 2408, 2406, which may allow the fairings 2602a, 2602b to rotate about the fairing bar 102 in a hinged connection.

Figure 25A:
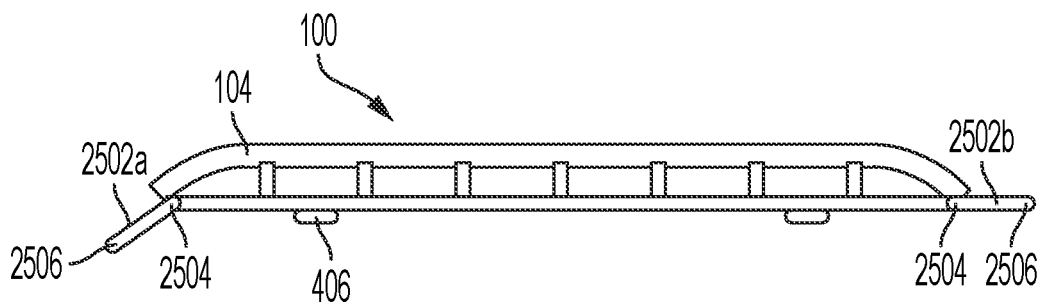
FIGS. 25A through 25C illustrate side views of the roof rack of FIGS. 1 through 6 with fairings installed in different positions in accordance with one or more embodiments of the disclosure.

FIG. 25A illustrates the fairings 2602a, 2602b in an open configuration (e.g., with the fairings 2602a down, such that the fairings 2602a, 2602b in conjunction with the outer bars 104 do not create a basket-like structure). In the open configuration, the fairings 2602a, 2602b being down may reduce the drag area of the roof rack 100. Thus, when the roof rack 100 is not being used to carry cargo, the fairings 2602a, 2602b may be positioned in the open configuration to reduce the air drag of the roof rack 100 and increase the efficiency of the associated vehicle. Furthermore, positioning the fairings 2602a, 2602b in the open orientation may also enable the roof rack 100 to carry cargo that extends beyond the front and rear portions of the roof rack 100, such as relatively long items, skis, kayaks, etc.

As illustrated in FIG. 25A, a first fairing 2602a may be angled downward, such that a tip 2506 of the fairing 2602a is at a lower level than a hinge end 2504 of the fairing 2602a. In some embodiments, the fairing 2602a may be on a front portion of the vehicle. The downward angle of the fairing 2602a may cause the fairing 2602a to act as a wind deflector, directing airflow over the roof rack 100 and improving the aerodynamics of the roof rack 100. In some embodiments, the fairing 2602a may be positioned on a rear portion of the vehicle. The downward angle may be configured to reduce the drag area of the roof rack 100.

The second fairing 2602b, may extend in a substantially level orientation, such that the fairing 2602b may be substantially aligned with the platform of the roof rack 100. For example, the tip 2506 of the fairing 2602b may be at substantially the same level as the hinge end 2504 of the fairing 2602b. Extending the fairing 2602b in a substantially level orientation may increase the cargo area of the roof rack 100.

Figure 25B:
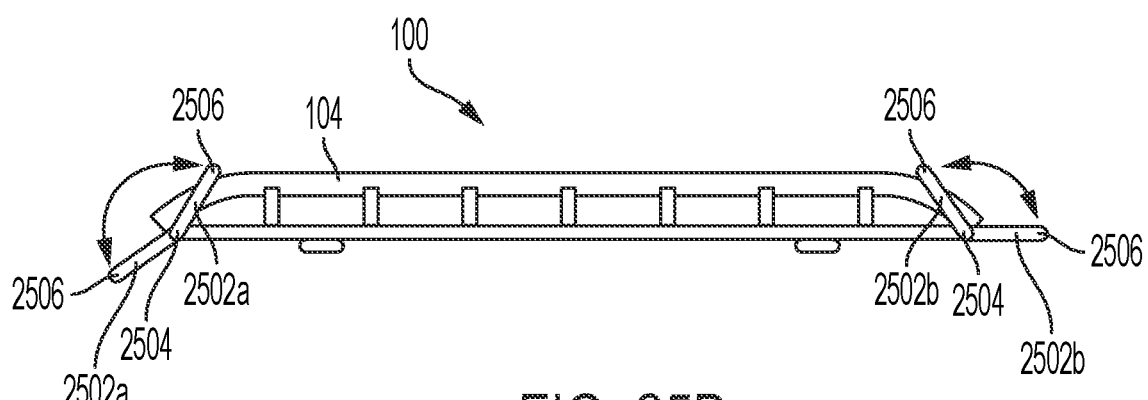
Figure 25C:
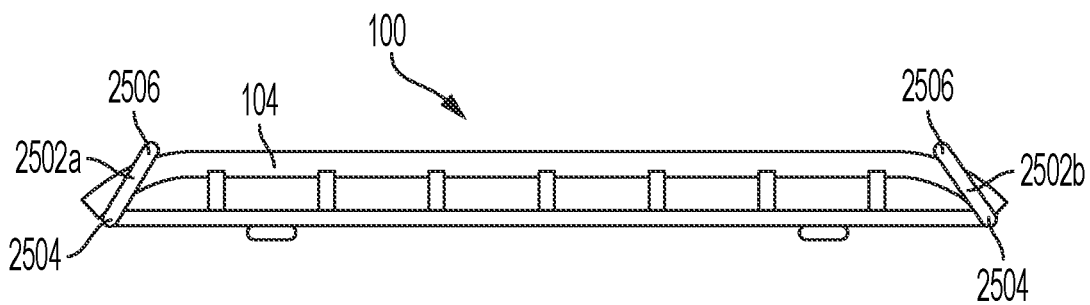

As illustrated in FIG. 25B, the fairings 2602a, 2602b may rotate about the hinge ends 2504 into a closed orientation (e.g., with both fairings 2602a, 2602b up in a basket-like configuration). FIG. 25C illustrates the fairings 2602a, 2602b in the closed configuration. In the closed configuration, the tips 2506 of each of the fairings 2602a, 2602b may be at substantially the same level as the top portion of the outer bars 104. Thus, the fairings 2602a, 2602b may in conjunction with the outer bars 104 and the cross bars 106 form a basket-like structure, enclosing all of the sides of the roof rack 100 to maintain cargo within the basket-like structure of the roof rack 100.

In some embodiments, the fairings 2602a, 2602b may be positioned at an angle, such that the fairings 2602a, 2602b substantially align with the curved ends of the outer bars 104, as illustrated in FIG. 25C. As described above, at least one of the fairings 2602a, 2602b may be a closed fairing 2402 configured to act as a wind deflector directing airflow over the roof rack 100.

Figure 26:
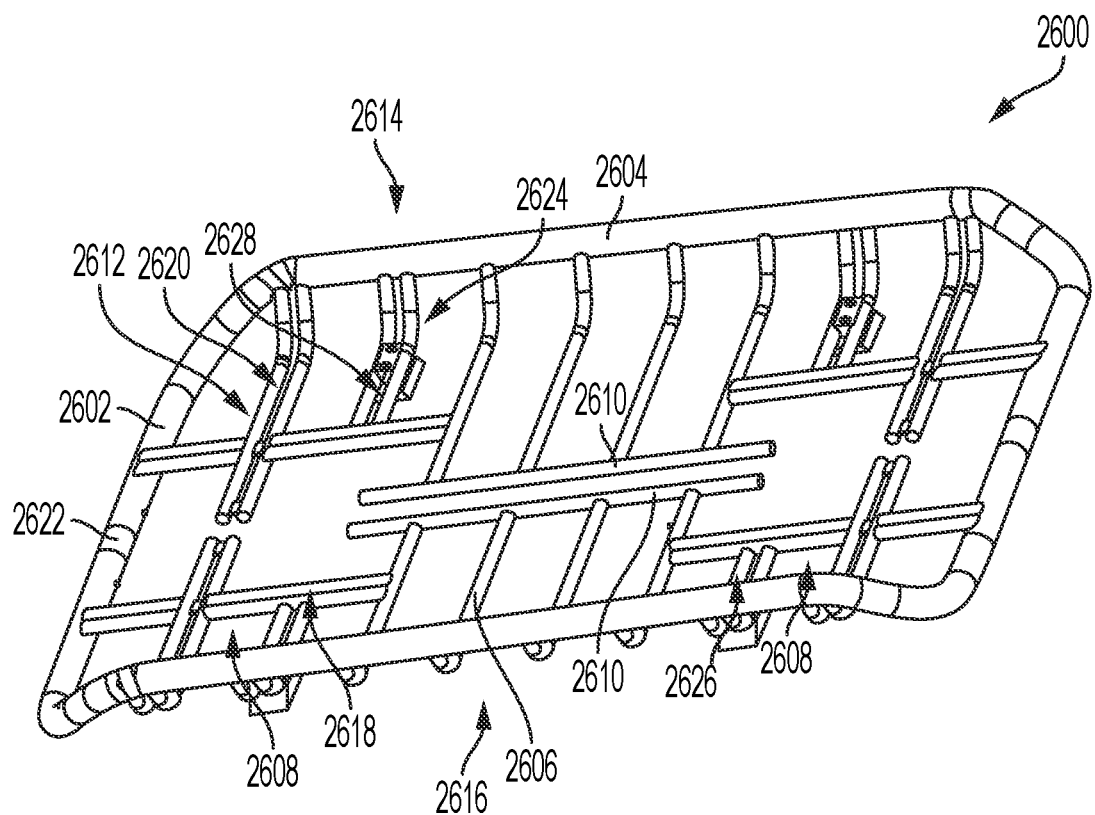
FIG. 26 illustrates a perspective view of a roof rack in accordance with one or more embodiments of the disclosure.

FIG. 26 illustrates another embodiment of a roof rack 2600 having an expandable width and multiple different mounting configurations. The roof rack 2600 may be formed in a first half 2614 and a second half 2616. The first half 2614 and the second half 2616 may be substantially identical.

Each half 2614, 2616 may include an outer bar 2604 configured to form a perimeter support for the roof rack 2600. The outer bar 2604 may be formed from a larger bar or heavier walled material (e.g., thicker material) from the other portions of the roof rack 2600, configured to provide structural strength and/or rigidity to the roof rack 2600. In some embodiments, the outer bar 2604 may be formed from a higher strength material than other parts of the roof rack 2600. As illustrated, the outer bar 2604 may substantially form an outer border of each half 2614, 2616 of the roof rack 2600. The ends of the outer bar 2604 may be positioned at a level of the central portion of the roof rack 2600 and a central portion of the outer bar 2604 may rise out of the plane of the roof rack 2600. In some embodiments, the central portion of the outer bar 2604 may be substantially flat in the raised configuration. The raised central portion of the outer bar 2604 may be configured to retain cargo stored on the roof rack 2600 and prevent or hinder cargo from sliding off the side of the roof rack 2600. The outer bar 2604 may curve at the ends (e.g., front end and rear end) to define a front and rear border of the associated roof rack 2600. The front and rear borders of the roof rack 2600 may form fairing bars 2602, similar to the fairing bars 102 described above with respect to FIGS. 1-3.

Similar to the roof rack 100, described above, the roof rack 2600 may be configured to act as a platform, such that the outer bar 2604 may not rise above the plain of the roof rack 2600. For example, the roof rack 2600 may be mounted in an inverted configuration such that rather than raising above the plane of the roof rack 2600 the outer bars 2604 may extend below the plane of the roof rack 2600.

Each half 2614, 2616 may also include an inner bar 2610 opposite the outer bar 2604. When the two halves 2614, 2616 are mounted together to form the roof rack 2600, the inner bars 2610 may be proximate one another in a central portion of the roof rack 2600. When the roof rack 2600 is in its narrowest configuration, the inner bars 2610 of the two halves 2614, 2616 may be close together or even in contact with one another. When the roof rack 2600 is in a wider configuration the distance between the inner bars 2610 of the two halves 2614, 2616 may increase.

Each half 2614, 2616 may include multiple cross bars 2606 extending between the respective inner bar 2610 and outer bar 2604. The cross bars 2606 may be configured to provide a support platform for cargo placed in the roof rack 2600. The cross bars 2606 may also provide tie-down locations for securing the cargo to the roof rack 2600. The cross bars 2606 may also be configured to provide additional strength and/or rigidity to the roof rack 2600.

Where the outer bar 2604 is raised or lowered into a different plane than the central plane of the roof rack 2600, an outer portion of the inner bars 2610 may be curved up or down to meet the outer bar 2604. The curved ends of the cross bars 2606 may form a basket-like structure configured to substantially prevent cargo from sliding off the side of the roof rack 2600.

The telescoping faring connection 2622 may be configured to slide inside the fairing bars 2602 of each of the first half 2614 and the second half 2616. For example, the outer bars 2604 forming the fairing bars 2602 may be formed from hollow tubes. The telescoping faring connection 2622 may be a tube or shaft having a similar shaped cross-section to the hollow tubes of the fairing bars 2602 with a smaller major dimension (e.g., diameter, radius, apothem, width, height, etc.), such that the telescoping faring connection 2622 may be inserted into the hollow portion of the fairing bars 2602.

Each half 2614, 2616 may include at least two vehicle connection points 2608. The vehicle connection points 2608 may be formed from two adjacent bars running transverse to the cross bars 2606. The two adjacent bars of the vehicle connection points 2608 may be separated by a small gap 2618. The gap 2618 may be configured to receive clamping hardware that may be coupled to a bracket for coupling the associated half 2614, 2616 of the roof rack 2600 to the vehicle as described above with reference to FIG. 5 through FIG. 10. The gap 2618 may extend the length of the vehicle connection point 2608, such that the position of the clamping hardware and bracket may be adjusted based on the application (e.g., vehicle, type of roof structure, etc.).

Each half 2614, 2616 may also include at least two accessory connection points 2612 on opposite ends of the respective first half 2614 and second half 2616. The accessory connection points 2612 may be configured to receive additional components, such as a roof container, ski mounts, bike mounts, light bars, etc. The accessory connection points 2612 may be formed from a bar running adjacent to one of the cross bars 2606 forming a gap 2620 similar to the gap 2618 in the vehicle connection point 2608. The gap 2620 may extend substantially the same length as the accessory connection point 2612. The gap 2620 may be configured to receive mounting hardware for the accessory mount. The accessory mounting systems are described in further detail with respect to FIG. 15 through FIG. 18. The accessory connection points 2612 in the first half 2614 and the second half 2616 may be substantially aligned when the roof rack 2600 is installed on a vehicle, such that an accessory may span the space between the first half 2614 and the second half 2616.

Each half 2614, 2616 may also include at least two additional connection points 2624. The connection points 2624 may be configured to function as an alternative vehicle connection point or to receive additional components, such as a roof container, ski mounts, bike mounts, light bars, etc. Similar to the accessory connection points 2612, the connection points 2624 may be formed from a bar running adjacent to one of the cross bars 2606 forming a gap 2628 similar to the gap 2620 in the accessory connection point 2612. The gap 2628 may extend substantially the same length as the connection point 2624. The gap 2628 may be configured to receive mounting hardware for an accessory mount or vehicle mount. The accessory mounting systems are described in further detail with respect to FIG. 15 through FIG. 18 and the vehicle mounting systems are described in further detail with respect to FIG. 29.

Figure 27:
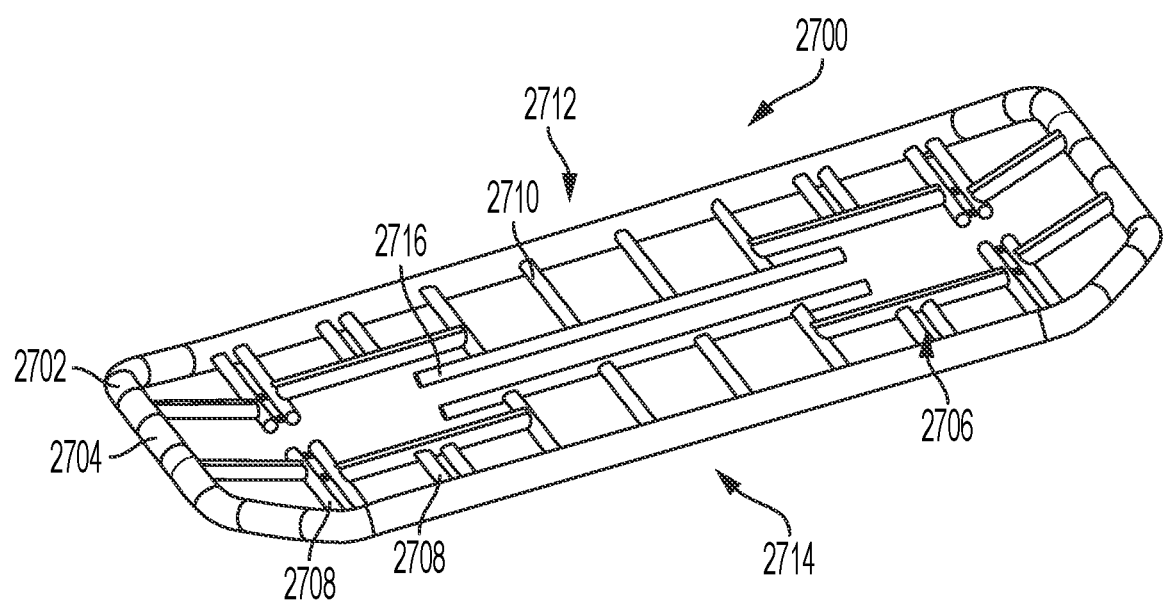
FIG. 27 illustrates a perspective view of a roof rack in accordance with one or more embodiments of the disclosure.

FIG. 27 illustrates another embodiment of a roof rack 2700. The roof rack 2700 may be formed in a first half 2712 and a second half 2714. The first half 2712 and the second half 2714 may be substantially identical.

Each half 2612, 2714 may include a border bar 2702 configured to form a perimeter support for the roof rack 2700. The border bar 2702 may be formed from a larger bar or heavier walled material (e.g., thicker material) from the other portions of the roof rack 2700, configured to provide structural strength and/or rigidity to the roof rack 2700. In some embodiments, the border bar 2702 may be formed from a higher strength material than other parts of the roof rack 2700. As illustrated, the border bar 2702 may extend along sides of the roof rack 2700 and wrap around at least a portion of a front and back of the roof rack 2700. The front and rear portions of the border bar 2702 may be raised or lowered relative to the border bar 2702 along the sides. The raised front and/or rear portions of the border bar 2702 may be configured to retain cargo stored on the roof rack 2700 and prevent or hinder cargo from sliding off the front and/or back of the roof rack 2700.

In some embodiments, the roof rack 2700 may be configured to act as a platform, such that the border bar 2702 may not rise above the plain of the roof rack 2700. For example, as described above, the roof rack 2700 may be mounted in an inverted configuration such that rather than raising above the plane of the roof rack 2700 the border bar 2702 may extend below the plane of the roof rack 2700. In other embodiments, the border bar 2702 may extend in substantially the same plane as the roof rack 2700, such that the roof rack 2700 may be substantially flat without lifted or lowered portions of the border bar 2702.

Each half 2712, 2714 may also include an inner bar 2716. When the two halves 2712, 2714 are mounted together to form the roof rack 2700, the inner bars 2716 may be proximate one another in a central portion of the roof rack 2700. When the roof rack 2700 is in its narrowest configuration, the inner bars 2716 of the two halves 2712, 2714 may be close together or even in contact with one another. When the roof rack 2700 is in a wider configuration, there may be a larger distance between the inner bars 2716 of the two halves 2712, 2714.

Each half 2712, 2714 may include multiple cross bars 2710 extending between the respective inner bar 2716 and border bar 2702. The cross bars 2710 may be configured to provide a support platform for cargo placed in the roof rack 2700. The cross bars 2710 may also provide tie-down locations for securing the cargo to the roof rack 2700. The cross bars 2710 may also be configured to provide additional strength and/or rigidity to the roof rack 2700.

Each half 2712, 2714 may include at least two connection points 2708. The connection points 2708 may be formed from two adjacent bars running parallel to the cross bars 2710. The two adjacent bars of the connection points 2708 may be separated by a small gap 2706. The gap 2706 may be configured to receive clamping hardware similar to the clamping hardware 506 described above with respect to FIG. 5 through FIG. 10. The clamping hardware may be coupled to a bracket for coupling the associated half 2712, 2714 of the roof rack 2700 to the vehicle, such as to the side rail 1102 or connecting rail 406 of the associated vehicle. The gap 2706 may extend the length of the connection point 2708, such that the position of the clamping hardware 506 and bracket 502 may be adjusted based on the application (e.g., vehicle, type of roof structure, etc.).

One or more of the connection points 2708 of the respective first half 2712 and second half 2714 may serve as an accessory connection point, similar to the accessory connection points 112 described above. Thus, one or more of the connection points 2708 may be configured to receive additional components, such as a roof container, ski mounts, bike mounts, light bars, etc.

The front and rear portions of the border bar 2702 of each half 2712, 2714 of the roof rack 2700 may act as a fairing mount location similar to the fairing bars 102 described above. The fairing and the mounting configuration may be similar to that described above with respect to FIGS. 24 through 25C.

The two halves 2712, 2714 may be coupled together through a telescoping connector 2704. The telescoping connector 2704 may be configured to slide inside the border bars 2702 at a connection point between the two halves 2712, 2714. For example, the border bars 2702 may be formed from hollow tubes. The telescoping connector 2704 may be a tube or shaft having a similar shaped cross-section to the hollow tubes of the border bars 2702 with a smaller major dimension (e.g., diameter, radius, apothem, width, height, etc.), such that the telescoping connector 2704 may be inserted into the hollow portion of the border bar 2702.

Figure 28A:
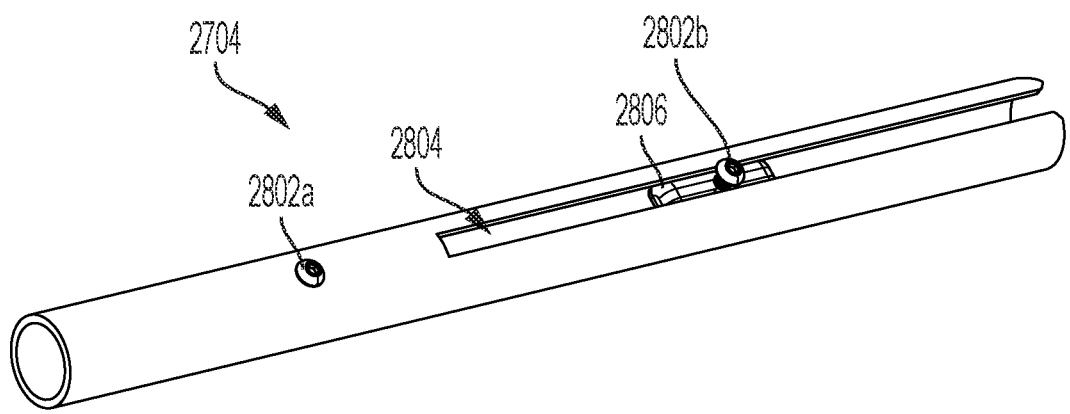
FIGS. 28A and 28B illustrate different embodiments of a telescoping connection of the embodiments of the roof rack illustrated in FIGS. 1-6, 26, and 27, in accordance with one or more embodiments of the disclosure.
Figure 28B:
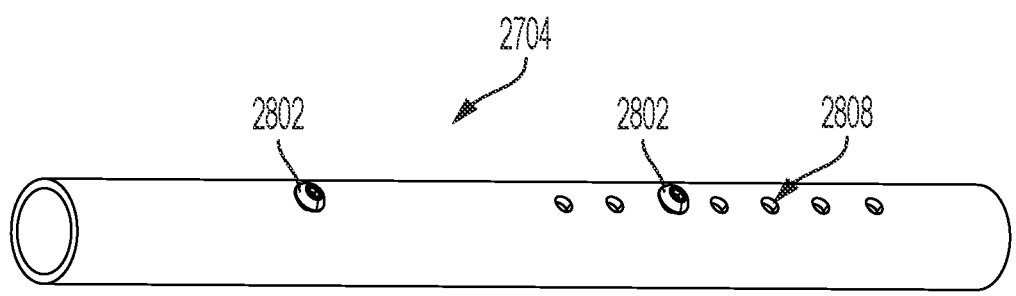

FIG. 28A and FIG. 28B illustrate views of different embodiments of the telescoping connector 2704 of the roof rack 2700. The embodiments of the telescoping connector 2704 illustrated in FIGS. 27A and 27B may also be used in the telescoping faring connection 202 (FIG. 2) of the roof rack 100 described above. In some embodiments, the telescoping connector 2704 may be used in an extendable cross bar, which may be mounted between roof rails of a vehicle independent of a roof rack. As described above, the telescoping connector 2704 may be a tubular element configured to be disposed into a hollow portion of the border bars 2702. The telescoping connector 2704 may include connecting hardware 2802 configured to lock the border bars 2702 into position relative to the telescoping connector 2704. The embodiments of the telescoping connector 2704 illustrated in FIGS. 27A and 27B illustrate different examples of adjustable interfaces between the telescoping connector 2704 and the border bars 2702.

The telescoping connector 2704 illustrated in FIG. 28A includes slot 2804 and an adjustable clamp 2806. The telescoping connector 2704 may include fixed connecting hardware 2802a, which may be in a fixed position relative to the telescoping connector 2704 and movable connecting hardware 2802b, which may be configured to change position along the telescoping connector 2704. The movable connecting hardware 2802b may be coupled to the clamp 2806. When the clamp is disengaged (e.g., in a non-clamping position, loose, free, etc.), the clamp 2806 and the associated movable connecting hardware 2802b may move along the slot 2804. The clamp 2806 may then be engaged (e.g., tightened, placed in a clamping position, tightened, etc.) to substantially fix the clamp 2806 and the movable connecting hardware 2802b in position relative to the telescoping connector 2704. The clamp 2806 may be coupled to one of the halves 2712, 2714 of the roof rack 2700 through the movable connecting hardware 2802b. The movable connecting hardware 2802b may be in a fixed position relative to the associated half 2712, 2714 of the roof rack 2700, such that as the movable connecting hardware 2802b and clamp 2806 move along the slot 2804, the associated half 2712, 2714 may also move along the telescoping connector 2704. When the position of the clamp 2806 and the movable connecting hardware 2802b is substantially fixed the position of the associated half 2712, 2714 may also be substantially fixed relative to the telescoping connector 2704 as well as the opposing half 2712, 2714 of the roof rack 2700, which may be coupled to the telescoping connector 2704 through the fixed connecting hardware 2802a.

The connecting hardware 2802 may be threaded fasteners (e.g., screws, bolts, studs, etc.), lever clamps (e.g., cam lever clamps, toggle clamps, etc.), pins (e.g., spring pin, clevis pin, etc.), etc. For example, the receiving element of the telescoping connector 2704, such as an aperture for the fixed connecting hardware 2802a or the clamp 2806 for the movable connecting hardware 2802b may be threaded to receive a threaded fastener. In other embodiments, the receiving element may be a through hole, such as for receiving a pin. In another embodiments, the receiving element may include a stud or pin projecting therefrom, such as to connect to a lever clamp.

The telescoping connector 2704 illustrated in FIG. 28B include a series of spaced apertures 2808 that may provide a stepped adjustment for the position of the movable connecting hardware 2802b relative to the telescoping connector 2704. For example, as described above, the position of the movable connecting hardware 2802b may be fixed relative to the associated half 2712, 2714 of the roof rack 2700, such that changing a position of the associated half 2712, 2714 of the roof rack 2700 relative to the opposing half 2712, 2714 of the roof rack 2700 may be accomplished by changing a position of the movable connecting hardware 2802b relative to the telescoping connector 2704. Therefore, the distance between the two halves 2712, 2714 of the roof rack 2700 may be changed by moving the movable connecting hardware 2802b to a different aperture 2808 of the series of spaced apertures 2808.

As described above, with respect to FIG. 27, the roof rack 2700 may be configured to be coupled to the side rails 1102 of a vehicle. FIG. 29 illustrates a side rail connector 2902 that may couple to the connection points 2708 to the side rails 1102 of a vehicle. The side rails 1102 of different vehicles may have different interface requirements. For example, the side rails 1102 on some vehicles may have a gap between the associated side rail 1102 and the vehicle, such that a clamping mechanism similar to the bracket 502 described above may be used to couple to the roof rack 2700 to the side rails 1102. Other vehicles may include side rails 1102 that are configured to receive a threaded fastener or another type of clamp or protrusion, such as a "T" channel, "J" channel, etc. Thus, the side rail connector 2902 may include a side rail interface 2904, which may be coupled to multiple different types of connectors to facilitate being coupled to different vehicles without changing the entire side rail connector 2902.

The side rail connector 2902 may also include a saddle 2906 similar to the saddle 802 described above. The saddle 2906 may include wings 2910 configured to interface with a top portion of the cross bars 2710 of the associated connection point 2708 and a protrusion 2914 configured to extend into the gap 2706 between the cross bars 2710 of the connection point 2708. One or more fasteners 2908 may extend through the protrusion 2914 to couple the saddle 2906 to the side rail interface 2904. The fasteners 2908 may clamp the cross bars 2710 of the connection point 2708 between the wings 2910 of the saddle 2906 and an upper surface of the side rail interface 2904, securing the roof rack 2700 to the side rail connector 2902. The side rail interface 2904 may then be coupled to the associated side rail 1102 through side rail interface hardware associated with the vehicle specific interface for the side rail 1102.

The embodiments of the present disclosure may enable a roof rack to be installed on multiple different vehicles and in multiple different configurations. The embodiments of the disclosure may reduce production costs by enabling a producer to create multiple roof racks that are substantially the same for use on many different vehicles. The embodiments of the disclosure may also increase the utility of the roof racks by enabling the same roof rack to be used in multiple different configurations based on the need of the user. This may enable a user to purchase one product to perform multiple different functions rather than purchasing multiple different products and uninstalling and reinstalling the multiple different products based on the task at hand.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A roof rack for a vehicle comprising:
   a first portion on a first side of the vehicle including a first outer bar, a first inner bar, and a first plurality of cross bars connecting the first inner bar to the first outer bar;
   a second portion aligned with the first portion on an opposite side of the vehicle including a second outer bar, a second inner bar, and a second plurality of cross bars connecting the second inner bar to the second outer bar; and
   an alignment bar telescopically coupled between at least one first cross bar of the first plurality of cross bars of the first portion and a second cross bar of the second plurality of cross bars of the second portion;
   wherein the first portion and the second portion are configured to separately connect to connecting rails of the vehicle, such that each of the first portion and the second portion may be independently positioned relative to the vehicle on the connecting rails.

2. The roof rack of claim 1, further comprising a clamping bracket configured to couple at least one of the first portion and the second portion to the connecting rails of the vehicle.

3. The roof rack of claim 2, wherein the clamping bracket comprises:
   a bracket;
   a spacing element extending substantially transverse to the bracket; and
   clamping hardware extending from the bracket in substantially the same direction as the spacing element from a position laterally offset from the spacing element.

4. The roof rack of claim 2, wherein the clamping bracket is configured to interface with a vehicle mounting structure of the roof rack.

5. The roof rack of claim 4, the vehicle mounting structure comprising at least two substantially parallel bars defining a gap between the at least two substantially parallel bars.

6. The roof rack of claim 5, wherein the at least two substantially parallel bars are substantially parallel to at least one of the first plurality of cross bars and the second plurality of cross bars.

7. The roof rack of claim 1, further comprising an accessory mounting structure comprising at least two substantially parallel bars defining a gap between the at least two substantially parallel bars.

8. The roof rack of claim 1, wherein the alignment bar is coupled between a first fairing bar of the first portion and a second fairing bar of the second portion.

9. The roof rack of claim 8, further comprising a fairing coupled to the first fairing bar and the second fairing bar, the fairing configured to rotate about the first fairing bar and the second fairing bar between an open position and a closed position.

10. The roof rack of claim 1, further comprising a roof rack mounting structure comprising:
    a mounting structure defined in the roof rack;
    a mounting bracket coupled to the mounting structure, the mounting bracket comprising;
       a spacing element extending substantially transverse to the mounting bracket extending between the mounting bracket and the mounting structure; and
       clamping hardware extending from the mounting bracket to the mounting structure from a position laterally offset along the mounting bracket from the spacing element.

11. The roof rack mounting structure of claim 10, wherein the mounting structure comprises at least two parallel bars defining a gap between the at least two parallel bars.

12. The roof rack mounting structure of claim 11, wherein the clamping hardware is configured to extend through the gap between the at least two parallel bars.

13. The roof rack mounting structure of claim 11, wherein the clamping hardware includes a saddle configured to span the gap coupling the clamping hardware to a surface of the at least two parallel bars opposite the mounting bracket.

14. The roof rack mounting structure of claim 11, wherein the mounting bracket is configured to move along the gap between the at least two parallel bars to change a position of the mounting bracket relative to the roof rack.

15. The roof rack mounting structure of claim 10, wherein the clamping hardware is configured to change an angle between the mounting bracket and the mounting structure by changing a length of the clamping hardware.

16. The roof rack mounting structure of claim 10, further comprising a support structure laterally offset from the mounting structure of the roof rack, the support structure configured to interface between the roof rack and a roof structure of a vehicle.

17. A method of adjusting a width of a roof rack mounted to a vehicle, the method comprising:
    loosening clamping hardware of a clamping bracket on a first portion of the roof rack, the clamping bracket including a spacing element extending transverse to the clamping bracket and the clamping hardware extending from the clamping bracket in substantially the same direction as the spacing element from a position laterally offset from the spacing element, the spacing element and the hardware causing the clamping bracket to pivot away from a connecting rail of a roof structure of the vehicle;
    sliding the first portion of the roof rack and the clamping bracket along the connecting rail of the roof structure of the vehicle;
    tightening the clamping hardware of the clamping bracket in a new location of on the connecting rail of the roof structure of the vehicle, the spacing element and the hardware causing the clamping bracket to pivot toward the connecting rail of the roof structure of the vehicle;
    loosening a second bracket on a second portion of the roof rack;

sliding the second portion of the roof rack and the second bracket along the connecting rail in an opposite direction from the first portion of the roof rack; and tightening the second bracket on the connecting rail of the roof structure of the vehicle.

18. The method of claim 17, wherein the first portion of the roof rack and the second portion of the roof rack are configured to slide independent of one another.

19. The method of claim 17, wherein the clamping bracket is coupled between the connecting rail and a vehicle attachment structure of the roof rack.

20. The method of claim 17, further comprising aligning the first portion and the second portion through a telescoping alignment bar.

* * * * *

UNITED STATES PATENT AND TRADEMARK OFFICE
CERTIFICATE OF CORRECTION

PATENT NO. : 12,420,717 B2
APPLICATION NO. : 17/810234
DATED : September 23, 2025
INVENTOR(S) : Alan Gustaveson Page 1 of 1

It is certified that error appears in the above-identified patent and that said Letters Patent is hereby corrected as shown below:

In the Claims

Claim 17, Column 20, Line 62, change "location of on the" to --location on the--

Signed and Sealed this
Fourth Day of November, 2025

John A. Squires
*Director of the United States Patent and Trademark Office*